United States Patent [19]

Smith et al.

[11] Patent Number: 4,573,207
[45] Date of Patent: Feb. 25, 1986

[54] QUEUED COMMUNITY REPEATER COMMUNICATIONS SYSTEM

[75] Inventors: Paul F. Smith, Fort Worth; Eric Schorman, Bedford; Tim Burke, Fort Worth; Chuck Lynk, Bedford, all of Tex.

[73] Assignee: Motorola, Inc., Schaumburg, Ill.

[21] Appl. No.: 564,950

[22] Filed: Dec. 22, 1983

[51] Int. Cl.4 ............................................. H04B 1/00
[52] U.S. Cl. .................................... 455/54; 455/17; 455/34; 455/58; 340/825.5
[58] Field of Search ................. 455/7, 11, 17, 18, 33, 455/53, 54, 58, 73, 34; 370/85, 89, 93, 95; 340/825.5, 825.51; 179/2 CB

[56] References Cited

U.S. PATENT DOCUMENTS

| Re. 23,313 | 12/1950 | Mitchell . |
| 2,541,932 | 2/1981 | Melhose . |
| 2,691,723 | 10/1954 | Nordahl . |
| 3,118,018 | 3/1959 | Cornell et al. . |
| 3,745,462 | 7/1973 | Trimble . |
| 3,749,845 | 7/1973 | Fraser . |
| 3,938,156 | 2/1976 | Son Lundén . |
| 3,955,140 | 5/1976 | Stephens . |
| 4,012,597 | 3/1977 | Lynk, Jr. et al. . |
| 4,013,959 | 3/1977 | Patterson . |
| 4,135,156 | 1/1979 | Sanders, Jr. et al. . |
| 4,247,947 | 1/1981 | Miyamoto . |
| 4,251,865 | 2/1981 | Moore . |
| 4,332,027 | 5/1982 | Malcolm et al. ............... 455/58 |
| 4,376,310 | 3/1983 | Stackhouse . |
| 4,414,661 | 11/1983 | Karlstrom ...................... 370/95 |
| 4,477,809 | 10/1984 | Bose ................................. 455/54 |

FOREIGN PATENT DOCUMENTS 2063011 5/1981 United Kingdom .

OTHER PUBLICATIONS

The Logical Design of Operating Systems, by Alan C. Shaw, 1974, Prentice-Hall, pp. 9-10, 152-153, 193-194, 73-74-75.

Primary Examiner—Jin F. Ng
Attorney, Agent, or Firm—Donald B. Southard; Raymond A. Jenski

[57] ABSTRACT

A communication system which controls access to a single communications channel by a plurality of remote units arranged in predetermined groups is disclosed. Assignment of the channel is controlled by a central control station which provides time periods on the channel for remote units to request permission to transmit on the channel. As the channel becomes clear, the central control station transmits a grant of service to a requesting remote unit group permitting real time transmission of voice or data on the channel. At the conclusion of the transmission, the central control station detects an end-of-transmission condition and revokes the grant of service to the served remote unit group.

31 Claims, 26 Drawing Figures

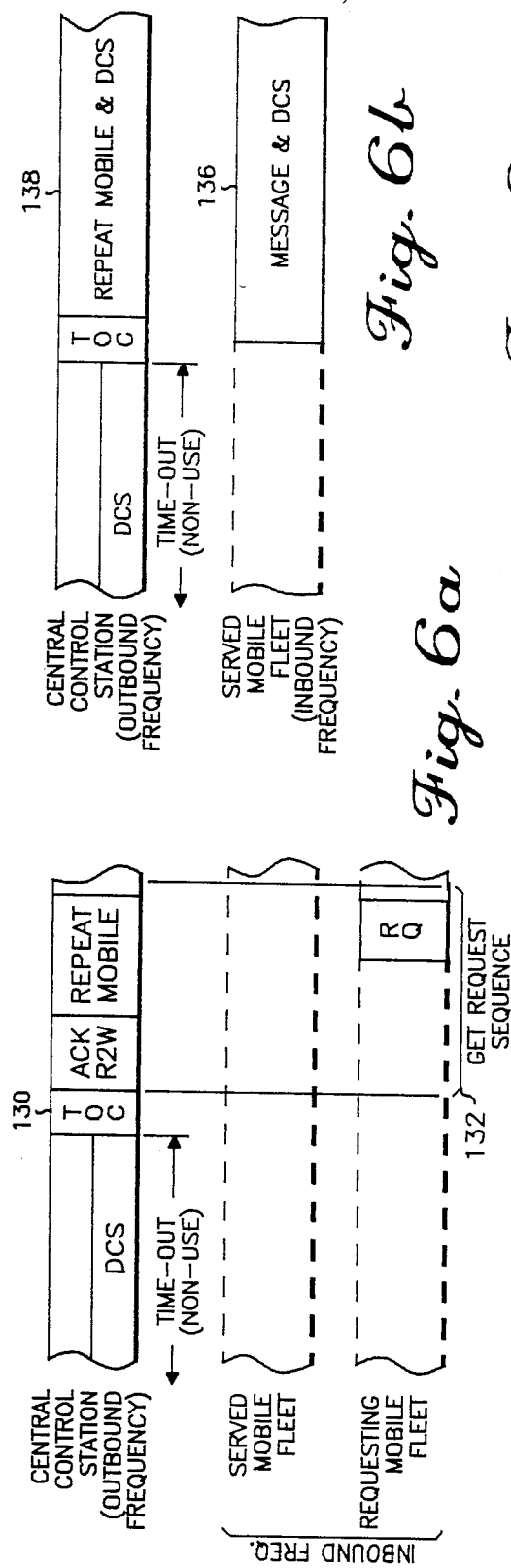
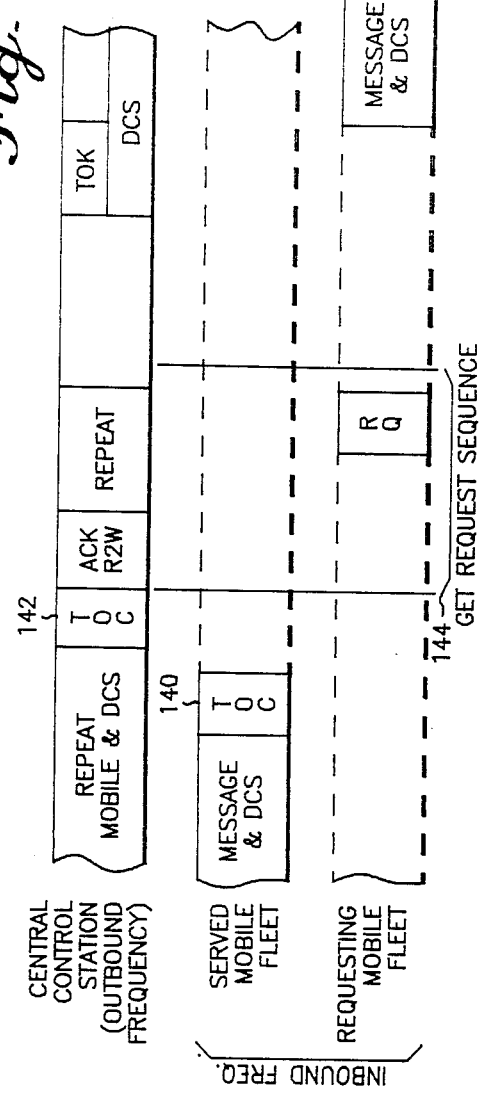
Fig. 6a
Fig. 6b
Fig. 6c

QUEUED COMMUNITY REPEATER COMMUNICATIONS SYSTEM

BACKGROUND OF THE INVENTION

This invention relates to single channel communications systems, particularly radio communications systems. Reference is made to two additional copending application, Ser. Nos. 564,855 and 564,634, filed on the same date as the present application and which contain related subject matter.

Direct mobile-to-mobile radio communication is limited in range by low antenna heights and relatively low power transmitters. In order to overcome these limitations and cover larger geographical areas, the concept of a single channel "community repeater" has developed whereby a receiver is coupled to a higher power transmitter at a location of favorable radio propagation. Signals from a mobile radio transmitter are received by the community repeater receiver and routed to the community repeater transmitter for rebroadcast to receiving mobiles. Many diverse groups of mobile users in the same community can utilize the same "repeater" by transmitting and receiving on the appropriate frequencies. Generally, the type of communication on a community repeater is a "push-to-talk, release-to-listen" message transmission of short duration between one mobile user and a kindred group of at least one other mobile user.

Crowded conditions can develop on the single communications channel as many different groups consisting of many mobile users attempt to use the channel. Common courtesy is often abandoned as mobile users transmit simultaneously in an effort to capture the channel and communicate their message. Mobile users who listen for a message directed to them or their group are exposed a cacophony of messages which are not of interest and may obscure the desired message.

To improve this situation, a number of developments, which are now well known, have been made. Common communication groupings or "fleets" of mobiles are formalized with special coding schemes such as continuous subaudible signals or precursor signals which are transmitted by a mobile to activate otherwise muted receivers of other members of its fleet. Directed calls of this sort reduce annoyance to the mobile user, for he no longer has to listen to every message on the channel, but they add to his operating burden as he must monitor the channel before transmitting. Also, even with these developments, access to the channel remains uncontrolled and contentious.

Coordinated multichannel radio systems, also well known, have provided better control of communications by automatically trunking a large number of user groups on a plurality of communication channels. Users in these systems automatically request service from a controlling means and receive a channel assignment and permission to transmit from the controlling means before being allowed to transmit on one of the channels. Although these systems are effective in reducing contention, the multi-channel operation protocol used by these systems is simply unusable for a single communication channel.

In addition to radio systems, the expanding field of multi-terminal processing has also generated an extensive need for sharing a scarce resource, i.e. a computer processor, among a large number of users. Time-sharing systems, which have been developed as a result of this need, typically place both request for service and message in a storage queue where they are subsequently analyzed by an allocation mechanism for eventual assignment to the computer processor. Unlike the present invention, which must coordinate the requesting process with real time message transmission on the single communications channel, the scarce computer processor resource is aloof from the requesting process and operates on the message in other than real time.

The present invention, for the first time, affords real time community repeater users and other users of a single channel relief from the aggravations of a crowded communications channel. Users' satisfaction improves once contention for this channel is handled automatically and once necessary user manipulations of the mechanics involved in obtaining service on the channel are reduced. In addition, channel efficiency is increased as more mobiles can be accommodated on the single communications channel due to the automated control exercised and the reduction of the need to repeat messages due to interference.

SUMMARY OF THE INVENTION

Accordingly, a primary object of this invention is to control real time communications between a multitude of users on a single communications channel.

Another object of this invention is to place requesting user fleet identifications in a queue for orderly assignment to the channel.

Another object of this invention is to prevent interfering transmissions from occuring on an occupied channel.

Another object of this invention is to reduce the mobile user's burden in accessing a channel and transmitting a message.

Another object of this invention is to provide privacy of communications.

These and other objects are achieved in this invention which is a communication system uniquely tailored for a single communications channel shared by a number of remotely located communication units arranged in predetermined groups. Assignment of the channel is controlled by a central control station which provides time periods on the channel for remote units to request permission to transmit on the channel. After a remote unit request is received by the central control station, the central control station transmits a grant of service to the remote unit and its predetermined group permitting real time transmission on the channel. At the conclusion of the transmission, the central control station detects a remote unit end-of-transmission condition. This detection activates the generation of a time period and causes the eventual revocation of the grant of service.

BRIEF DESCRIPTION OF THE DRAWINGS

FIG. 6A is a relative timing diagram of channel activity showing, time-out non-use.

FIG. 6B is a continuation of 6A showing a missed time-out non-use signal and continued mobile unit message transmission.

FIG. 6C is a relative timing diagram of channel activity showing a time-out for exceeding the maximum allowed time.

DETAILED DESCRIPTION

The communications system which is the preferred embodiment of this invention is a Queued Community Repeater (QCR) system. The centralized controlling function of the QCR system receives coordinated requests for service from members of groups of remote units called fleets, places these requests in a queue for orderly service, and allocates a single communications channel for use by each fleet in turn. This communications channel is a pair of radio frequencies separated from each other such that mutual interference is avoided. Transmissions from remote unit to a central control station occur on one "inbound" radio frequency and transmissions from the central control station occur on a second, "outbound", radio frequency. When the channel is allocated to a fleet of remote units, one remote unit of the fleet transmits a message on the inbound frequency. The central control station receives the message and retransmits it to the receiving remote units of the fleet on the outbound frequency. Control signals from the central control station and requests for service from the remote units are also transmitted on the outbound and inbound frequencies respectively.

Figure 1:
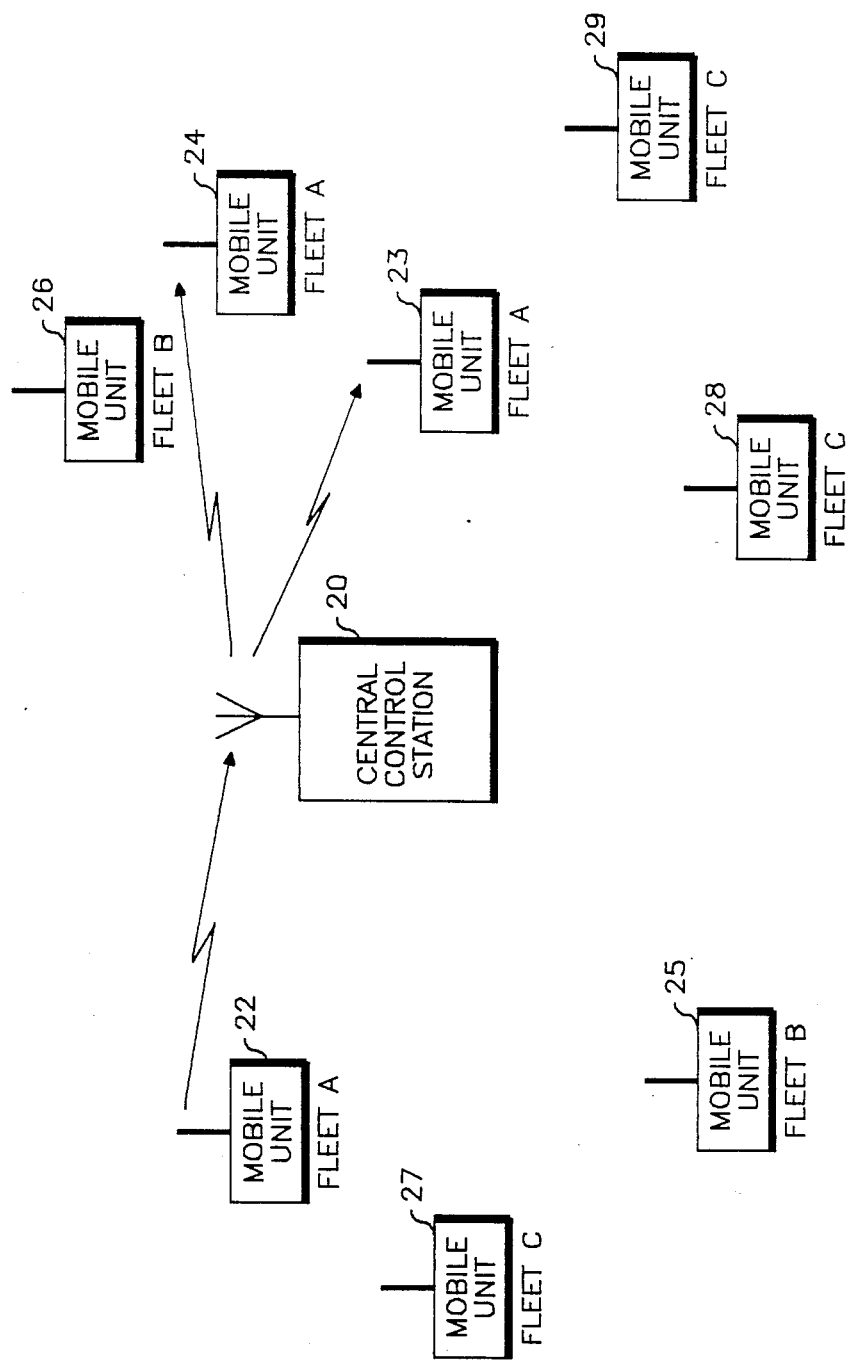
FIG. 1 depicts a Queued Community Repeater System with three selected groups of mobile units.

Referring to FIG. 1 showing an example of a QCR system, three fleets of remote units, which in this embodiment are predominantly units located in transportation vehicles but could also be hand-held portable units or fixed units (hereinafter called mobiles), are depicted in the coverage area of a central control station 20. Fleet A is composed of mobiles 22, 23, and 24. Similarly, fleet B is composed of mobiles 25 and 26, and fleet C is composed of mobiles 27, 28, and 29. In the hypothetical situation employed to describe the present invention, mobile 22 of fleet A is transmitting a message which is repeated by the central control station 20 to the other mobiles of fleet A. When mobile 22 completes its transmission, it transmits an end-of-transmission TOC (Turn-Off-Code) signal and in response, the central control station 20 provides a period of time wherein a mobile from another fleet may request permission to gain service on the channel. Following this period of time, the channel is re-assigned to fleet A for a possible reply message from one of the other fleet A mobiles.

Figure 2:
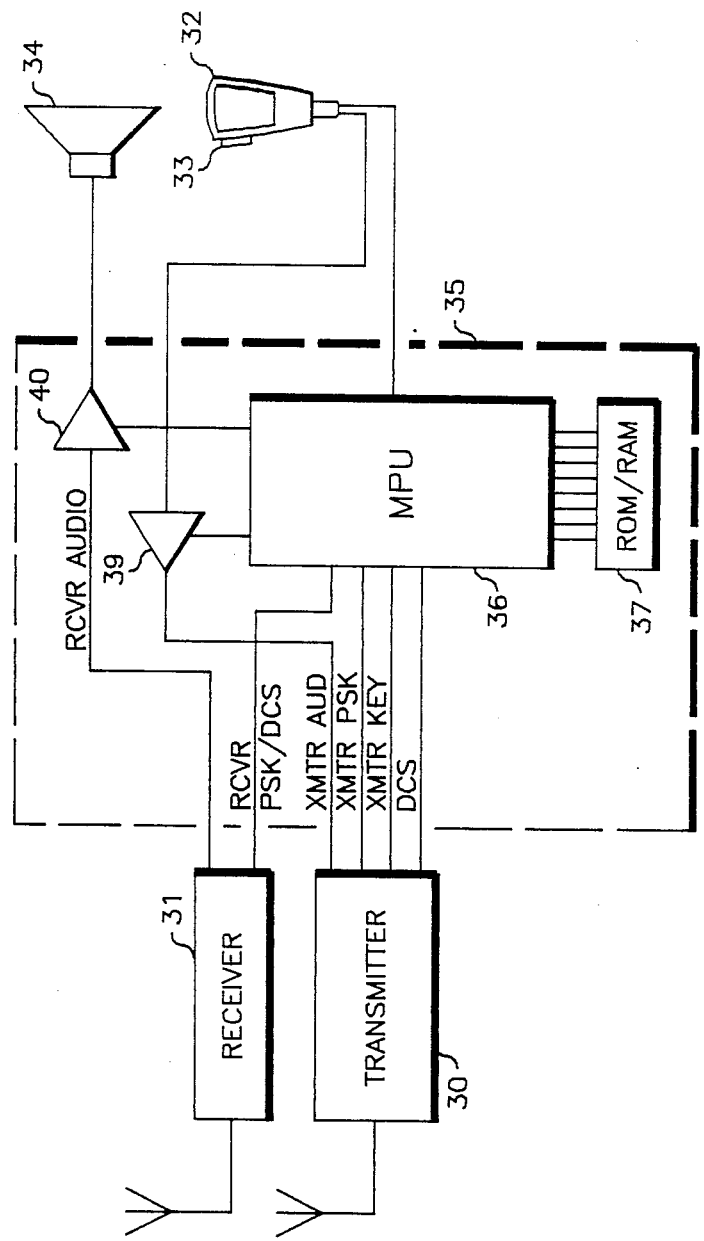
FIG. 2 is a block diagram of one of the mobile units.

A mobile unit, as diagrammed in FIG. 2, consists primarily of a radio transmitter 30, a radio receiver 31, a microphone 32, a push-to-talk (PTT) button 33 located on the microphone 32 and used to indirectly activate the transmitter, a speaker 34 to convert the received message to sound, and a microprocessor control unit 35. The microprocessor control unit 35 itself consists of a microprocessor 36, associated RAM and ROM 37, a microphone audio gate 39, and a receiver audio gate 40.

Upon the user pushing the PTT button 33 indicating a desire to communicate a message, a signal is input to microprocessor 36 which responds to its instructions recalled from ROM/RAM 37 and system data received via receiver 31. When a control signal is received from the central control station 20, the microprocessor 36 activates the mobile transmitter 30 and transmits a burst of data (600 BPS PSK in the preferred embodiment) to the central control station 20 to request service. The central control station 20 returns a grant of service on the outbound frequency when the channel is available to the requesting mobile. This grant of service, received by mobile receiver 31, is coupled to microprocessor 36 where the software instructions responsively causes the generation of a sub-audible digital code signal hereinafter called DCS and causes the microprocessor to enable the microphone audio gate 39 and the receiver audio gate 40.

With the mobile unit in the enabled state, the user may now communicate a message by again pushing and holding the PTT button 33 and speaking into the microphone 32. The message now converted to an electrical signal, is conducted through the microphone audio gate 39 to the transmitter 30 where it is combined with the sub-audible DCS code and transmitted to the central control station 20. Each fleet of mobiles has a DCS code unique to that fleet and used to activate only those mobiles within the fleet.

At the conclusion of the message, the user releases the PTT button 33 causing the microprocessor 36 to generate a sub-audible end-of-transmission Turn-Off-Code (TOC) data burst. The TOC is subsequently transmitted by the mobile transmitter 30 before the microprocessor 36 deactivates the transmitter.

The central control station 20 uses the TOC to activate a request sequence to be described later and then send the particular fleet DCS code to reactivate the fleet. The mobile of FIG. 2 receives the DCS code in mobile receiver 31 and couples it to the microprocessor 36 where a determination is made whether the received DCS code is the one unique to this mobile's fleet. If it is, a detect is coupled to microprocessor 36 which enables the microphone audio gate 39 and the receiver/audio gate 40. When another mobile of the fleet transmits on the inbound frequency, the central control station 20 repeats the message on the outbound frequency which is received by the mobile receiver 31 and passed through the enabled receiver audio gate 40 to the speaker 34. The receiver audio gate 40 is disabled when the PTT button 33 is pushed.

Figure 3:
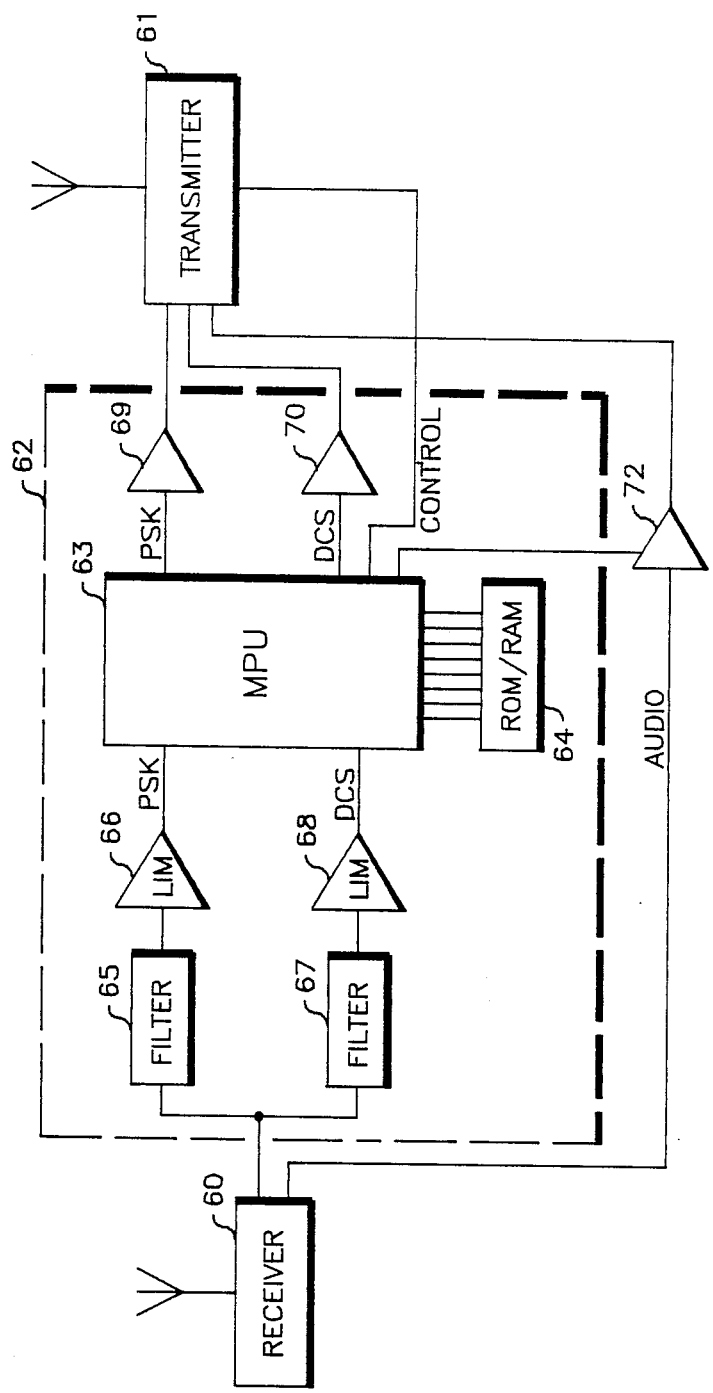
FIG. 3 is a block diagram of a Queued Community Repeater System (QCR) central control station.

Referring to FIG. 3, the central control station 20 is composed of three main components: a repeater receiver 60, a repeater transmitter 61 and a microprocessor-based controller 62 hereinafter called a QCR Controller. Receiver 60 and transmitter 61 are well known in the art except in this system they are adapted to be under the control of QCR Controller 62. The QCR Controller 62 consists of a microprocessor 63, associated RAM and ROM 64, a data signalling filter 65 and limiter 66, a subaudible DCS signalling filter 67 and limiter 68, an output amplifier for data signalling 69, and an output amplifier for subaudible DCS signalling 70. The QCR Controller receives both PSK signalling data and subaudible DCS transmitted from a mobile unit via repeater receiver 60 and appropriate filters and limiters. The QCR controller outputs PSK signalling data and DCS for transmission by repeater transmitter 61 to mobile units via output amplifiers 69 and 70.

Requests for service from mobiles are received by repeater receiver 60 after the microprocessor 63, directed by instructions from ROM/RAM 64, sends an "acknowledge" signal via output amplifier 69 and repeater transmitter 61 to all mobiles monitoring the outbound frequency. Coordinated by this "acknowledge" signal, mobiles whose users have pushed the PTT button 33 can request permission to transmit a message by transmitting a PSK data request signal. The microprocessor 63 decodes the PSK request signal and places the requesting mobile's fleet identification in a first-in, first-out (FIFO) queue in ROM/RAM 64. When the requesting mobile fleet's turn is next in line, the microprocessor 63 transmits a "transmit OK" (TOK) PSK signal (via output amplifier 69 and repeater transmitter 61) to the requesting mobile's fleet and simultaneously transmits the unique fleet DCS code (via output amplifier 70 and repeater transmitter 61). The fleet mobiles are thus enabled, as described previously, and one of the fleet mobiles may transmit.

The microprocessor 63 recognizes a proper DCS code transmitted by the mobile, enables the gate 72 allowing transmitter 61 to retransmit the mobile message and DCS received by receiver 60, and ceases to generate fleet DCS. At the conclusion of the mobile message the microprocessor 63 detects the DCS TOC and reinitiates the "acknowledge" sequence.

Figure 4:
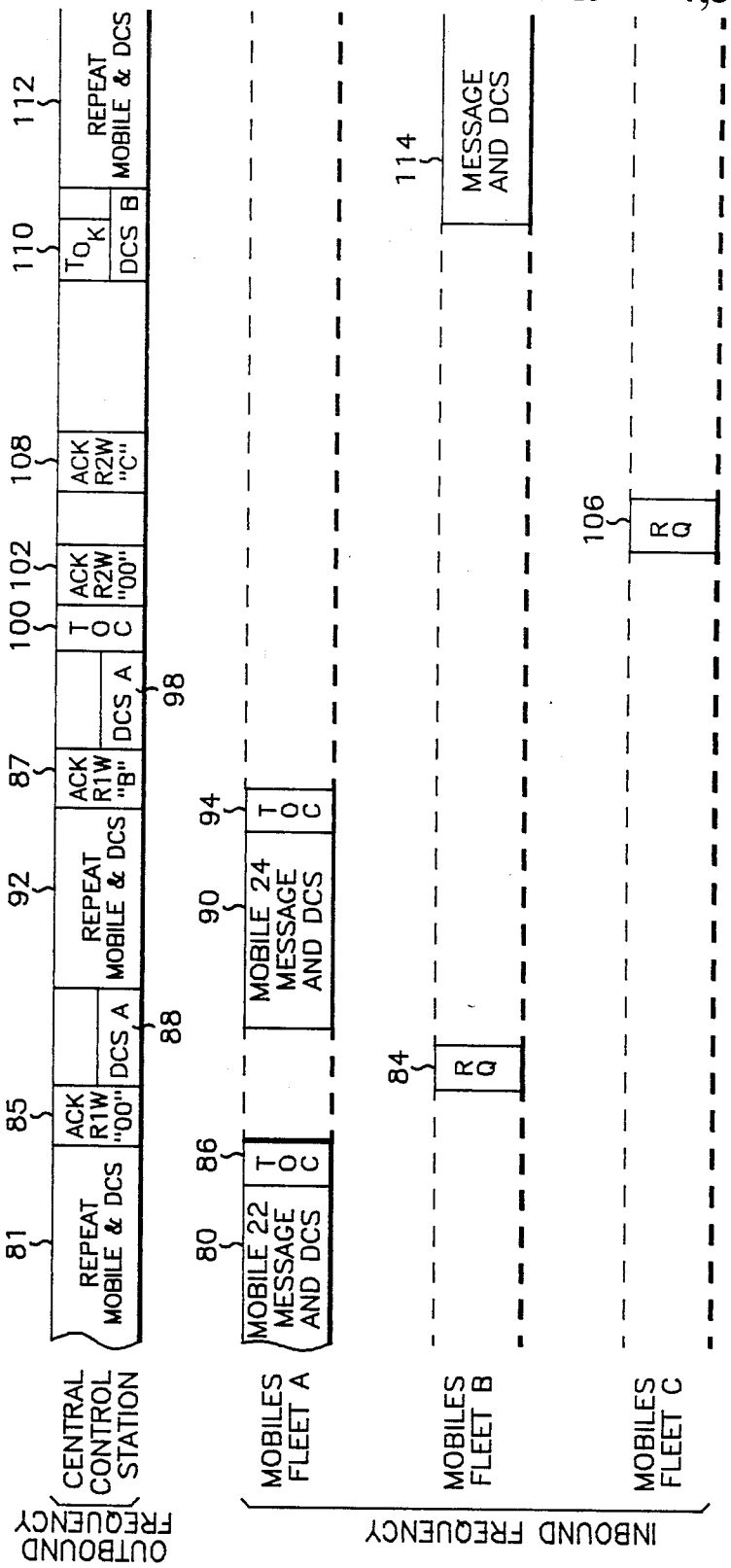
FIG. 4 is a relative timing diagram of the control signals and messages occurring on the channel.

A relative timing diagram for the hypothetical system, FIG. 4, provides an illustration of the exchange of control signals between the central control station 20 and mobiles in the coverage area. As previously stated, mobile 22 of fleet A is transmitting a message 80 on the inbound frequency which is immediately repeated 81 by the central control station 20 on the outbound frequency. Users of mobiles not currently having permission to operate on the channel, such as those in fleets B and C, request permission to transmit on the channel during sychronized periods established by the QCR Controller 62.

Therefore if the user of a fleet B mobile pushes the push-to-talk (PTT) button indicating a desire to communicate a message to the other members of fleet B, a request for service 84, containing the fleet B identification, is delayed by the mobile until synchronizing signal 85 is transmitted from the central control station 20. This synchronizing signal 85 is an "acknowledge" which is transmitted by the central control station 20 when it detects an end-of-transmission TOC 86 sent by a transmitting mobile upon the mobile user releasing the PTT switch. By causing requests for service to occur in the gap between the transmissions of mobiles, interference with on-going messages of a served mobile fleet is eliminated. In addition all non-active fleets have the receiver audio disabled in each mobile. Users in these fleets cannot listen to the conversations of the active fleet, and do not know who, if anyone, is using the channel. In this controlled system, the mobile user does not have to monitor the channel before making a request.

The QCR Controller 62 receives the fleet B mobile request via the repeater receiver and places the fleet B identification in the FIFO queue. The request is acknowledged at the first opportunity with an "acknowledge" signal 87 which also serves as a signal marking the commencement of the period of time available for requests.

Two types of "acknowledge" signals are employed for non-data message transmission: ACKR1W and ACKR2W. The first is an "acknowledge" of a previous request and a solicitation for a new request for service to be taken on the inbound frequency in a "window" of time immediately following the ACKR1W. The second "acknowledge" also confirms a previous request and solicits new requests for service in one of two overlapping time windows randomly selected by the mobile unit so that contention will be minimized. The QCR controller repeats the inbound channel following the ACKR2W to allow mobiles requesting in window #2 to hear requests in window #1. They will then inhibit their request to prevent collision. An ACKR2W is repeated until no further requests are received, thereby increasing the rate at which requests may be gathered after a fleet message sequence is finished on the channel.

Following an ACKR1W acknowledge (and commencement) signal 85, the mobile from fleet B transmits the request for service 84 to the central control station 20. The QCR Controller 62 does not return an "acknowledge" to fleet B at this time, but transmits the subaudible DCS code 88 which is unique to fleet A. This DCS code is transmitted so that the fleet A mobiles will be re-enabled immediately following the request period. In this way, an exchange of messages between mobiles of fleet A can occur without interruption provided the users respond within a predetermined period of time.

Another mobile of fleet A begins transmitting a message 90 to the mobiles of fleet A via the central control station 20 following the re-authorization DCS code 88. An identical fleet A DCS code is transmitted by the fleet A mobile continuously with the message. This code is detected by central control station 20 which ceases generation of fleet A DCS code and repeats 92 both the mobile message 90 and the fleet A DCS code generated by the transmitting fleet A mobile. Detection of a proper fleet DCS code alone is sufficient to "enable" all mobiles of the fleet for the duration of the DCS code and message transmission.

In this aspect, the QCR system utilizes a signalling scheme more like a "continuous" scheme rather than a "preamble" scheme. A mobile which did not receive the initial permission-to-transmit PSK signal will unmute its receiver and enable its transmitter as soon as the proper DCS code is detected. The user is then able to hear part of the message. This recovery of a "lost" mobile into an ongoing conversation is a valuable feature of the QCR system.

When the user of the fleet A mobile releases the push-to-talk button at the end of the message 90, an end-of-transmission TOC 94 is generated. This TOC 94, as TOC 86 before, triggers the QCR Controller 62 to transmit an "acknowledge" 87 containing the identification of the last requesting mobile fleet—in this example, fleet B—and soliciting other requests for service.

Following "acknowledge" 87, QCR Controller 62 transmits fleet A's DCS code 98 to allow mobiles in fleet A continuing use of the channel. Since no fleet A mobile transmits on the channel, a matching DCS code from a fleet A mobile is not detected at the QCR Controller 62. After a predetermined period of time, the QCR Controller 62 transmits a TOC 100 to deactivate fleet A mobiles and an ACKR2W acknowledge 102 notifying all mobiles that requests for service will be accepted before the channel is allocated to fleet B. Any mobiles which were unable to request service during the transmission gaps of fleet A can be added to the queue before the reallocation of the channel. In this instance, no new mobile requests for service were received following the previous "acknowledge" 87 and the queue contains only one mobile request (of fleet B) so the dummy ID "00" is transmitted with ACKR2W 102.

A mobile from fleet C responds to ACKR2W 102 with a request 106 which causes the QCR Controller 62 to transmit an ACKR2W acknowledge 108 with fleet C's identification. This sequence will continue indefinitely as long as requests are received.

Since no additional mobiles respond to the ACKR2W 108 of a "get request" sequence, the QCR Controller 62 selects the proper DCS code of the next mobile fleet in queue, fleet B. This DCS code is transmitted by the central control station 20 concurrently with a permission to transmit (TOK) command 110 forming a grant of service to the mobiles of fleet B. The TOK is sent for two reasons: it takes other fleets out of a "channel clear" condition to be described later, and it informs mobiles requesting data service that they may have missed their "acknowledge" and should request again.

As the TOK 110 is completed, the central control station 20 continues to send fleet B DCS on the outbound frequency and looks for an identical DCS on the inbound frequency. When the DCS code from a fleet B mobile is detected, the "handshake" is complete, and the central control station 20 stops transmitting fleet B DCS and begins to repeat 112 the incoming fleet B DCS and message 114. Listening fleet B mobiles decode their DCS and are enabled irrespective of whether the DCS code is generated or repeated by the central control station 20. The use of DCS as the authorization allows mobiles to join their fleet's conversation in progress if they power-on or come into range after the initial allocation.

To the non-requesting mobile, all requests, assignments, and messages involving other fleets are ignored. Acknowledgements and other messages involving its own fleet are monitored. Thus, a mobile knows the precise status of its fleet at any and all times. The mobile user, however, is not aware of (and not burdened by) the status until an actual message is heard on the channel. The mobile knows if its fleet is in the queue but not active. If this user subsequenctly presses the PTT switch to make a request, an actual request is not transmitted since the unit knows that its fleet is already in the queue. Thus, only one request per fleet is normally made and contention is greatly reduced.

Figure 5A:
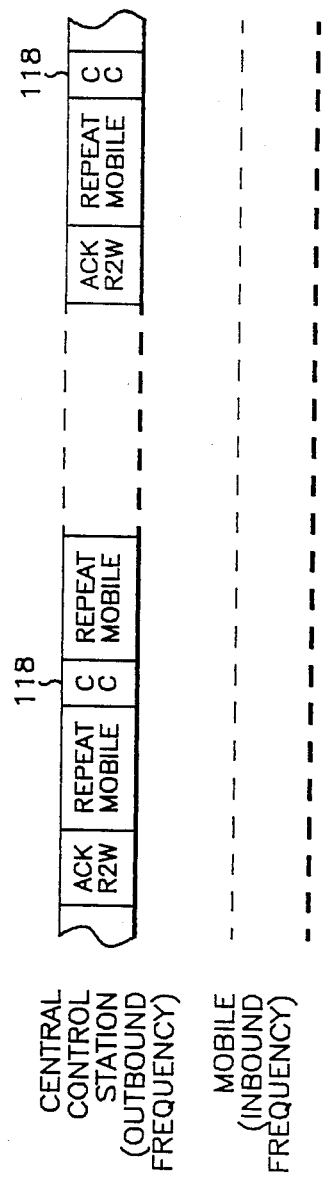
FIG. 5A is a relative timing diagram of channel activity when the central control station is in the "channel clear" mode.
Figure 5B:
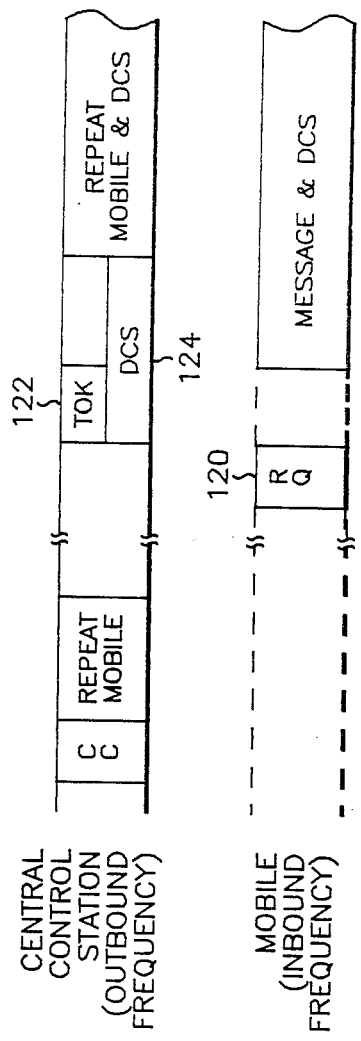
FIG. 5B is a continuation of 5A which shows a mobile unit requesting service during the "channel clear" mode.

Referring now to FIG. 5A, when there are no fleets in the queue and when the channel is not allocated, the QCR Controller 62 sends out a "channel clear" command 118. This "channel clear 118 command is transmitted periodically at 30 second intervals and is used by the mobiles as a "keep alive" function. As shown in FIG. 5B, a mobile does not have to wait for an "acknowledge" before requesting service when the system is in a "channel clear" condition. When a mobile in the channel clear condition sends a request 120, it receives a TOK data packet 122, which also takes other fleets out of the "channel clear" condition, along with a superimposed DCS code 124 which authorizes the requesting fleet to utilize the channel. A TOK may thus be considered as a "non-channel clear" command, as well as an enabling transmit OK.

Referring to FIGS. 6A, 6B, and 6C, the QCR Controller 62 performs two time out (TO) functions to deactivate a currently active fleet. A fleet may be timed out for not utilizing the channel (non-use) or for exceeding the maximum time allowable (max-time). When the QCR Controller 62 assigns the channel to a fleet, it starts a time-out non-use (TONU) timer for the fleet. If, as in FIG. 6A, no fleet mobiles respond within the time-out time, as determined by DCS detection, the QCR Controller 62 transmits TOC 130 as a time-out and muting function thereby revoking the grant of service. If no served fleet DCS is detected by the QCR Controller 62 following the time-out, the QCR Controller 62 adopts a "get request" sequence 132 to solicit requests for service from another fleet.

If a served fleet DCS 136 is detected, FIG. 6B, (a mobile missed the time-out TOC) but the fleet did not yet exceed its maximum allowed time, the OCR Controller 62 reassigns the channel to the fleet by repeating the incoming DCS code 138 to enable the other mobiles. If the maximum allowed time were exceeded, the central control station waits until the mobile DCS drops and performs another time-out to disengage the fleet. When the fleet assignment is revoked, the central control station may make a new assignment.

A fleet is allowed a maximum amount of time the complete an exchange of messages which in this embodiment is in the order of 60 seconds. When the time expires, as in FIG. 6C, the QCR Controller 62 waits for the next end-of-transmission TOC 140 transmitted from the mobile and subsequently checks the status of the queue. If the queue is occupied, the QCR Controller 62 transmits a time-out TOC 142, a "get request" sequence 144 is activated, and the channel is subsequently allocated to the first member in the queue. If the queue is unoccupied, the QCR Controller 62 repeater does not deactivate the current fleet but waits for the next end of transmission signal and checks the status of the queue again.

QCR Controller

Several QCR Controller processes previously discussed in conjunction with the timing diagram require detailed consideration on a microprocessor flowchart level in order that the operation of the present invention be fully understood:

1. Channel Clear

Figures 7, 8:
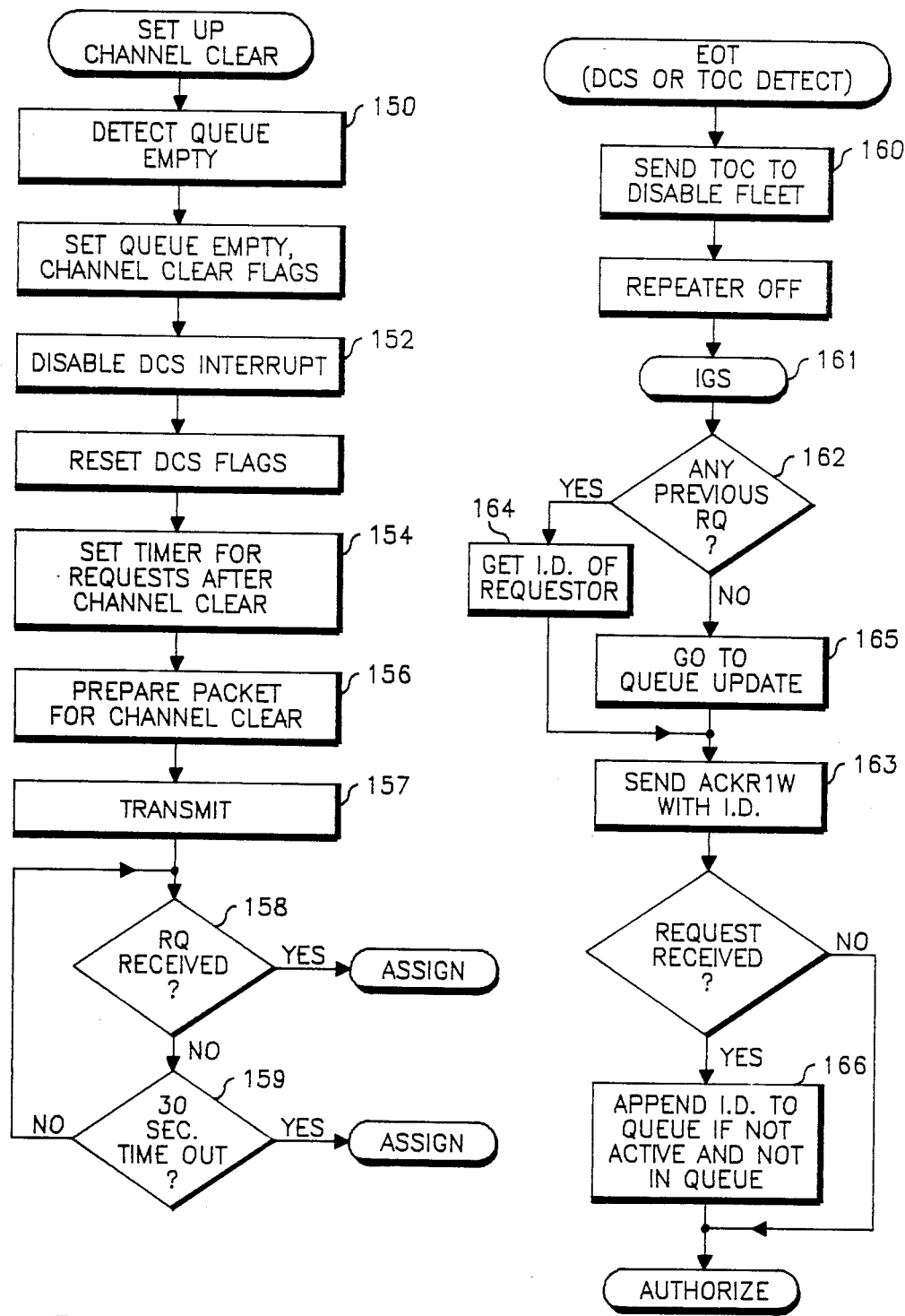
FIG. 7 is a QCR Controller flowchart for the "channel clear" subroutine.
FIG. 8 is a QCR Controller flowchart for the end-of-transmission and intragap signalling subroutine.

Referring to FIG. 7, when there are no fleets in the queue and when the channel is not allocated, the QCR Controller sends out the "channel clear" command. Channel clear is transmitted periodically for example every 30 seconds, as a "keep alive" feature to inform mobiles that the system is operational and that they are in radio range. If a mobile does not receive valid QCR Controller data for two minutes, the mobile unit will disable its transmitter. If the mobile is simply out of range, when it comes within range and is able to detect the signal again, it will revert to normal operations. If the mobile cannot receive signals due to some mechanical or electrical problem, the keep alive feature will disable the transmitter to prevent it from disrupting other mobiles in the system.

Under the channel clear condition, a mobile does not have to wait for an "acknowledge" before requesting service. When a mobile in the channel clear condition sends a request, it receives a TOK data packet to take other fleets out of channel clear and a superimposed DCS code to authorize the requesting fleet.

As shown in FIG. 7, the sequence of steps followed by the QCR Controller is detecting the presence of an empty queue 150, preventing DCS interrupts of the routine 152, preparing to accept and process a mobile request 154, preparing and transmitting a channel clear signal 156 and 157. If a request is received 158 the assign routine will allocate the channel, or after the 30 second keep alive period 159 the assign routine will restart the channel clear routine.

2. Requests

When the channel is being utilized by a fleet, as previously described, requests from other fleets are synchronized to come in during the intertransmission gap. The synchronization signal is an "acknowledge" which is transmitted by the QCR Controller when it detects a DCS turn-off code (TOC) sent by the mobile when the user releases his PTT switch. The two-way signalling between voice transmissions is called the intra-gap signalling (IGS). To minimize the IGS time, the QCR Controller delays the acknowledge for a particular request until the following IGS. The synchronizing "acknowledge" includes confirmation of the request from the previous IGS, or if there was no request, a dummy ID is transmitted with the "acknowldge".

Referring to FIG. 8, the End Of Transmission (EOT) routine is entered when the controller detects loss of DCS or detects TOC. The controller than transmits the TOC 160 briefly to ensure that the fleet is disabled. Upon the QCR Controller entering the IGS sequence 161, it first checks its storage for a previous request 162 which must be acknowledged. It then transmits an "acknowledge" with either a previous requesting mobile fleet ID 164 or a mobile fleet ID in the waiting queue 165 as an update. The QCR Controller awaits a request response to the "acknowledge" and if one is received, the requesting mobile fleet ID is added to the queue if its fleet ID is not already in the queue, 166. Whether or not a request is received, the QCR Controller "authorize" routine will transmit the original fleet's DCS code again at the proper time so that the fleet will be reenabled by the time a request packet is finished. The mobiles will be muted and disabled by the data occurring in the gap and must wait for the re-authorizing DCS before they may transmit.

Figure 9:
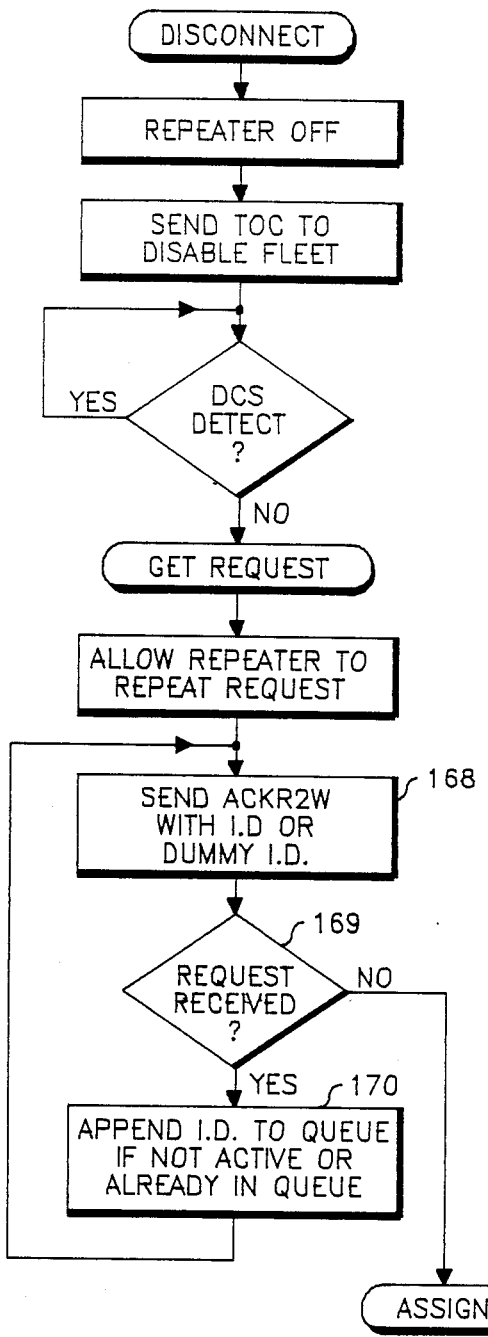
FIG. 9 is a QCR Controller flowchart for the disconnect and "get request" subroutines.

After an active fleet has been deactivated and before the channel is allocated to another fleet, the QCR Controller initiates request sequences so that additional fleets can be added to the queue before re-allocation of the channel. This sequence is called "get request" and shown in FIG. 9. The QCR Controller initiates this request sequence by sending an "acknowledge" with a dummy ID in the ID field 168. If a request comes in 169, the QCR Controller sends an "acknowledge" 168 with the ID of the requesting fleet 170, and allows more requests to come in. The QCR Controller continues to acknowledge the incoming requests until none is received in any sequence. At this time the channel is allocated to the first fleet in the queue via the "assign" routine.

3. Queue Updates

Figure 10:
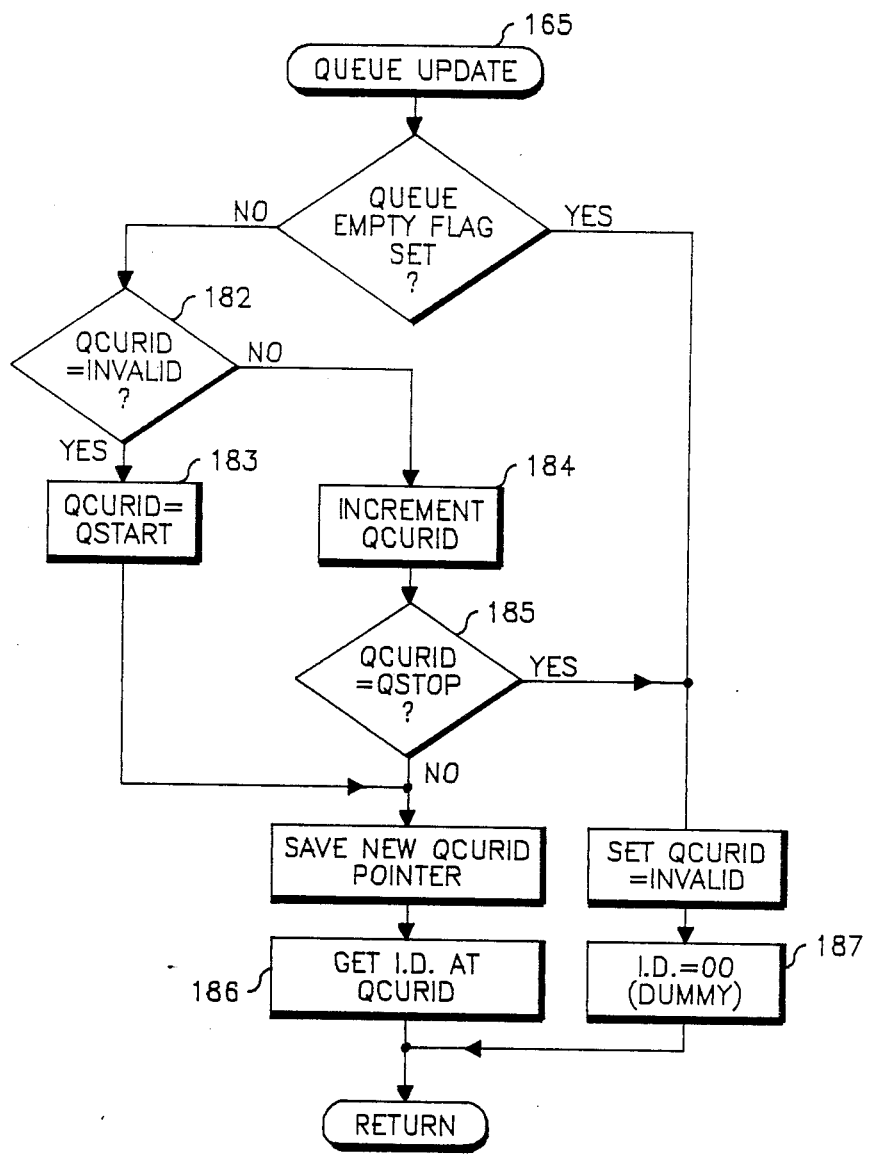
FIG. 10 is a QCR Controller flowchart for the queue update subroutine.

As previously mentioned, the "acknowledge" signal not only confirms requests, but also triggers requests during the IGS and "get request" periods. Referring again to FIG. 8, when requests in the IGS mode must be triggered and there are no requesting mobiles 162 which must be acknowledged, an "acknowledge" is sent with a dummy ID established by the Queue Update Subroutine 165. Typically, this dummy ID is always "00", which is an invalid ID for a fleet. However, the system uses this opportunity to update one of the fleets in the queue. Each time the QCR Controller needs a dummy ID, it selects the next ID in the queue and acknowledges that fleet. Referring to FIG. 10, the selection process starts at block 182 which tests the value of pointer QCURID for an invalid pointer value. If an invalid value is found, the pointer is reset 183 to the start of the requesting mobile queue. If QCURID is valid (which means more requesting mobile fleet ID's are in the queue and at least one ID has been recalled from the queue and updated), the pointer is incremented by one, 184. QCURID is tested for reaching the end of the queue 185 and if it is not at the end, the fleet ID located at the storage locations indicated by QCURID is made available 186 for updating at the next "acknowledge" signal. When the end of the queue is reached ID "00" is used as a delimiter 187. The Queue Update routine will inform all mobiles of the Fleet ID's which are on the queue. One fleet will be updated during each IGS, if no new requester needs to be acknowledged. The ID "00" delimiter indicates that the entire queue has been updated. Thus, a mobile which thinks it is in the queue may re-request if it decodes two "acknowledge" signals with an ID "00" without receiving an "acknowledge" with its ID between them.

This type of queue update could be done with either the ACKR1W during the IGS or the ACKR2W during the "get request" sequence, or both. For simplicity, and because of the low throughput of the latter, only the IGS ACKR1W opportunity is used for queue updates in the preferred embodiment. The ACKR2W always uses the dummy ID of "00" when there is no previous request.

4. Authorization.

Figure 11:
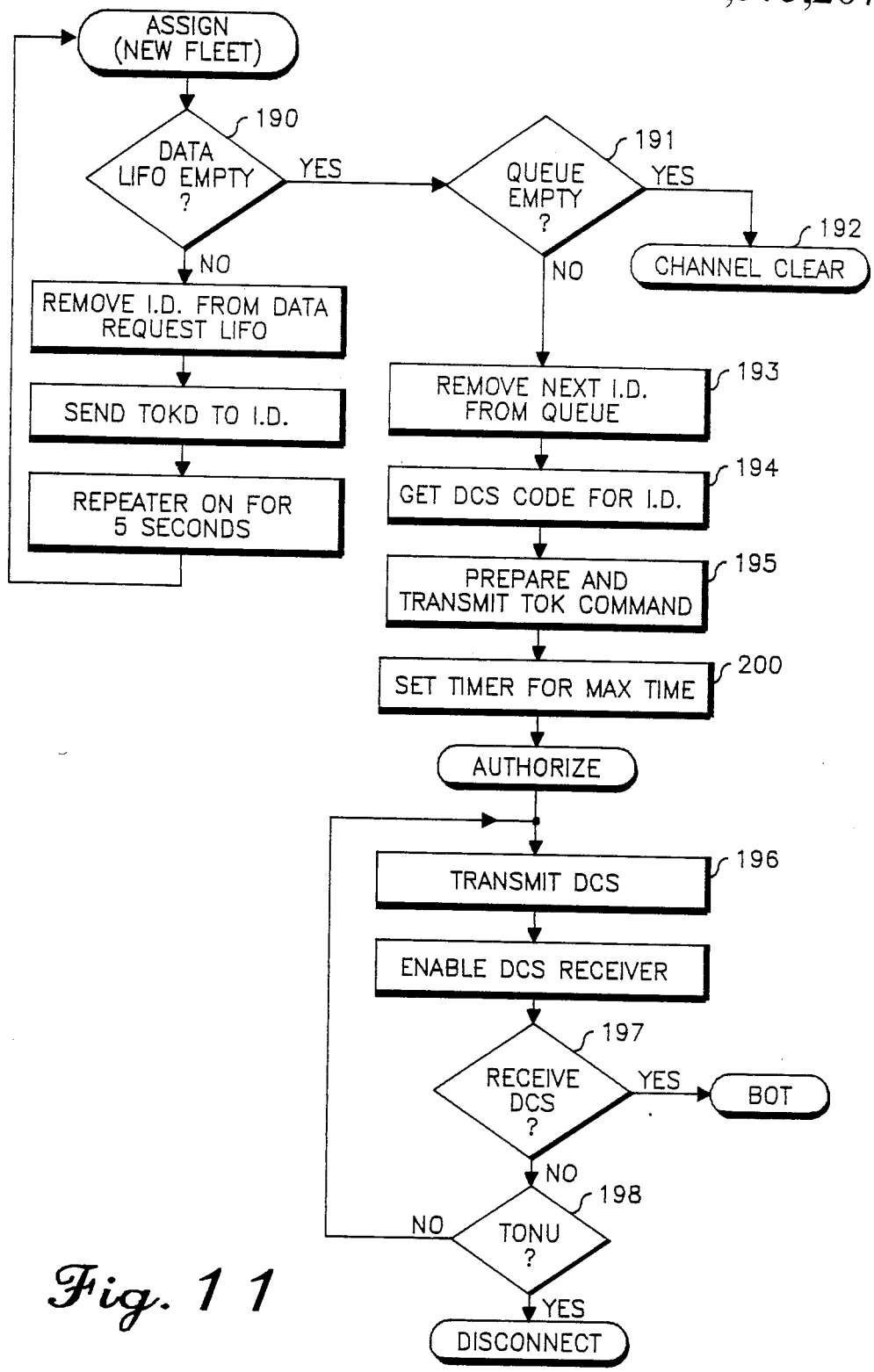
FIG. 11 is a QCR Controller flowchart for the assign and authorize subroutines.

When the QCR Controller is ready to reassign the channel, it follows the "assign" and "authorization" routine as diagrammed in FIG. 11. The Controller decides 190, 191 whether any mobile requests remain in the queue. If the queue is empty, the channel clear routine is established 192. If requests remain in the queue, the QCR Controller recalls the next fleet in the FIFO queue 193, selects the DCS code associated with the recalled fleet 194, prepares the TOK command 195, and transmits both the DCS code and the PSK TOK data command. After the TOK has been transmitted, the DCS 196 will be continually transmitted while attempting to detect the mobile DCS 197 on the receive channel.

Decoding either the TOK or the DCS is sufficient to enable the mobiles of the selected fleet. The mobiles of that fleet become active, that is, their audio is unmuted and the transmitters are enabled. Should one of the mobiles begin transmitting, it will transmit the same DCS code to the QCR Controller on the inbound frequency. The QCR Controller will decode the incoming DCS 197, and the Beginning of Transmission (BOT) routine will be entered. If DCS is not received from the mobile, a time-out-non-use (TONU) timer 198 is started, and the disconnect routine will be entered when the timer times out.

Figure 12:
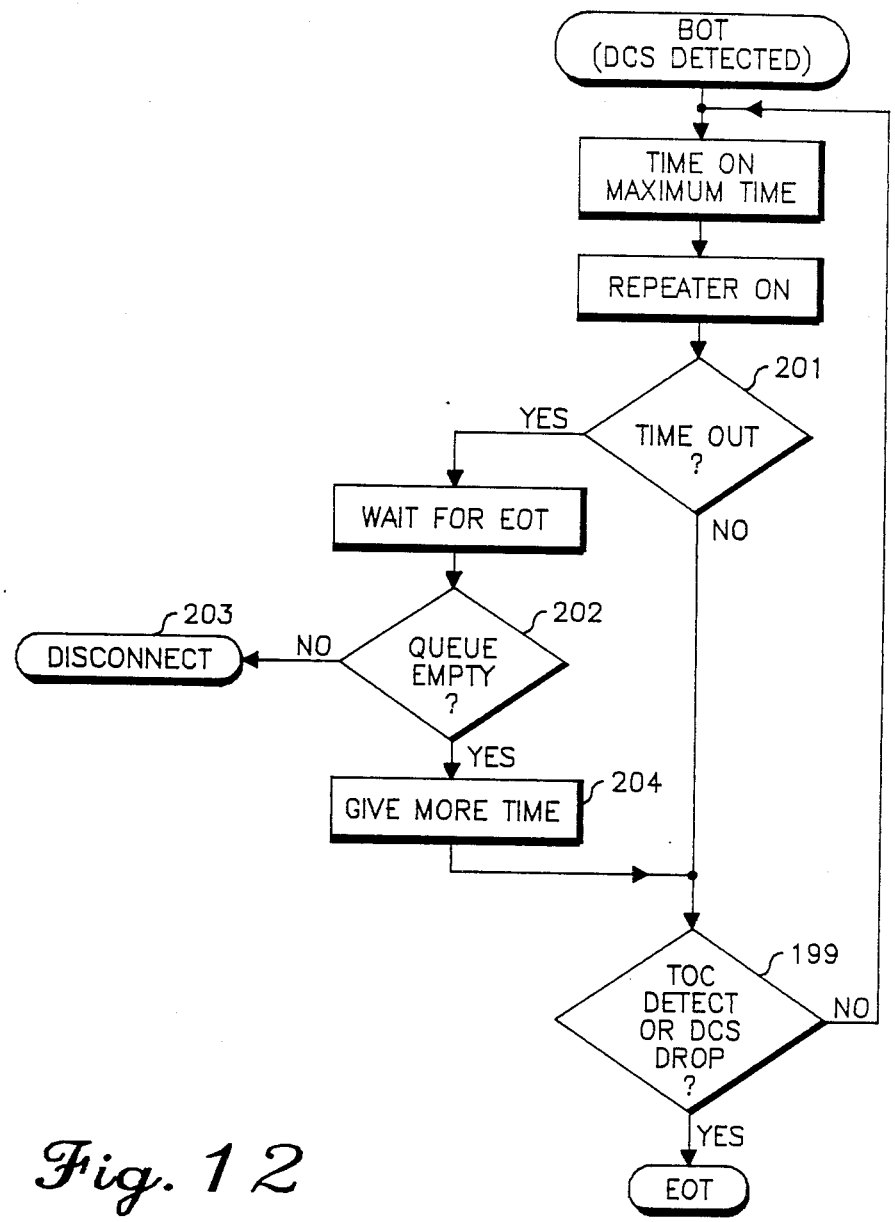
FIG. 12 is a QCR Controller flowchart for the beginning-of-transmission subroutine.

When reception of the proper DCS causes the BOT routine to be entered, the controller will cause the incoming voice and DCS to be repeated. Referring to FIG. 12, if the continuous DCS detect is lost or TOC is detected 199, the End of Transmission (EOT) routine is entered.

5. Timers

The QCR Controller times both the active periods and the inactive periods of message transmission activity of a fleet's channel allocation. The QCR controller will deactivate the fleet when the maximum allowed message time is exceeded. It will also deactivate the fleet if any pause between transmissions exceeds a "time-out-non-use" (TONU) time. Rather than have a fixed TONU for all transmissions, the QCR Controller adjusts the TONU to the circumstances, that is, whether or not other fleet ID's are waiting in the queue. When a fleet is initially allocated the channel, a timer 200, FIG. 11, is set and that fleet can transmit messages and maintain access to the channel for a maximum of 60 seconds in the present implementation, if others are waiting in the queue.

Referring to FIG. 12, when the time expires 201, the QCR Controller waits for the next end of transmission and then checks the status of the queue 202. If the queue is occupied, the disconnect sequence 203 is started. When a fleet is successfully timed out, the QCR controller performs a "get request" sequence before allocating the channel to the first fleet in the queue. If the queue is unoccupied, the QCR Controller does not deactivate the current fleet but provides more time 204. The QCR Controller then waits for the next end of transmission and again checks the status of the queue. Additional time will continue to be granted until a request is made by a mobile of another fleet.

In addition to the maximum time out, the QCR Controller starts the time-out-non-use (TONU) timer when a fleet is assigned a channel. If a mobile does not respond within the time out time, as determined by DCS detection, the fleet is deactivated. If one does respond, subsequent transmissions are similarly timed to allow channel reuse when the conversation ceases or pauses excessively.

Figure 13:
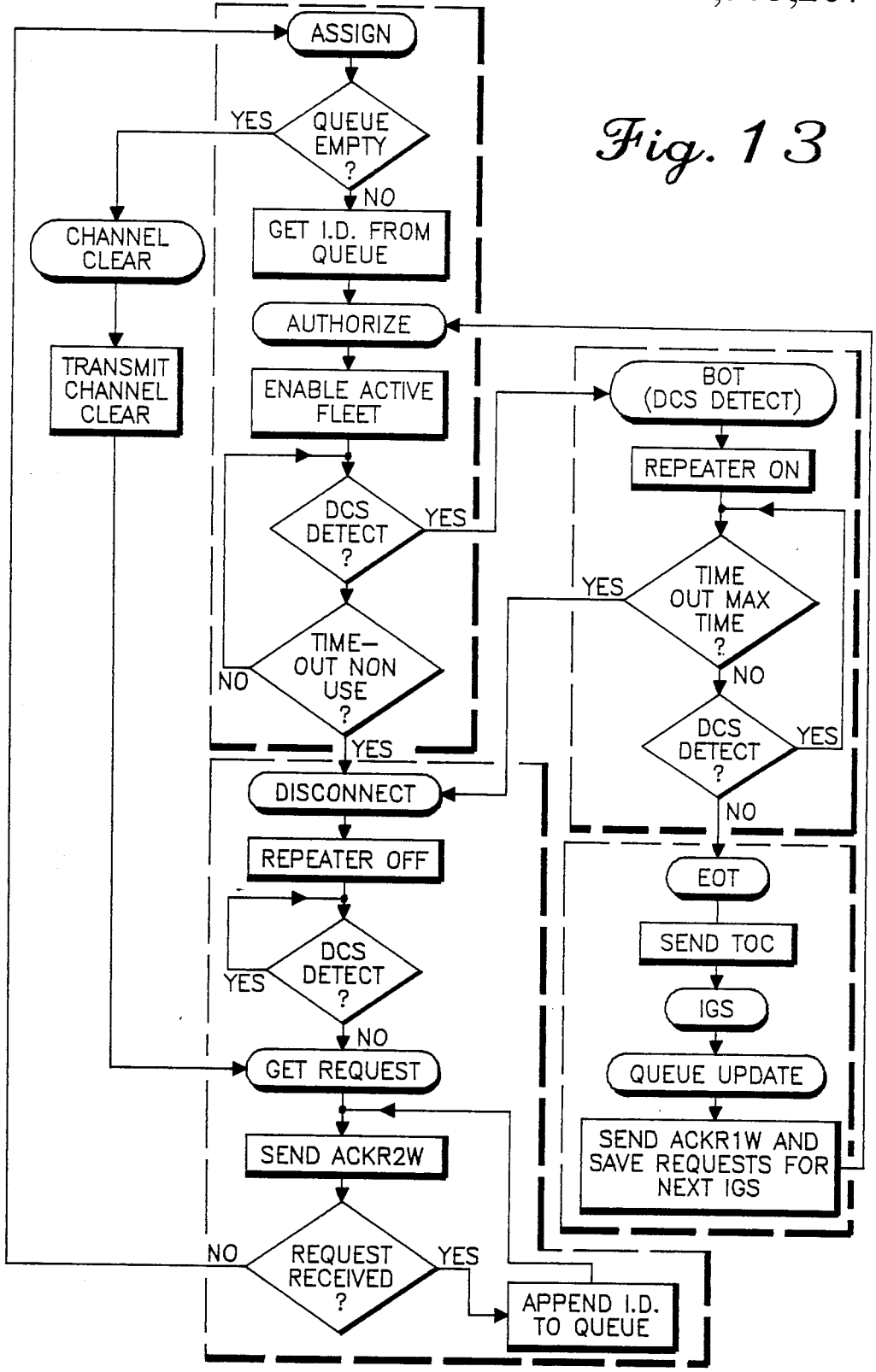
FIG. 13 is a QCR Controller flowchart showing an integration of the subroutines into an operating protocol.

The aforementioned processes are integrated to form a QCR Controller operating protocol as shown in simplied form in FIG. 13.

Mobile unit

Figure 14:
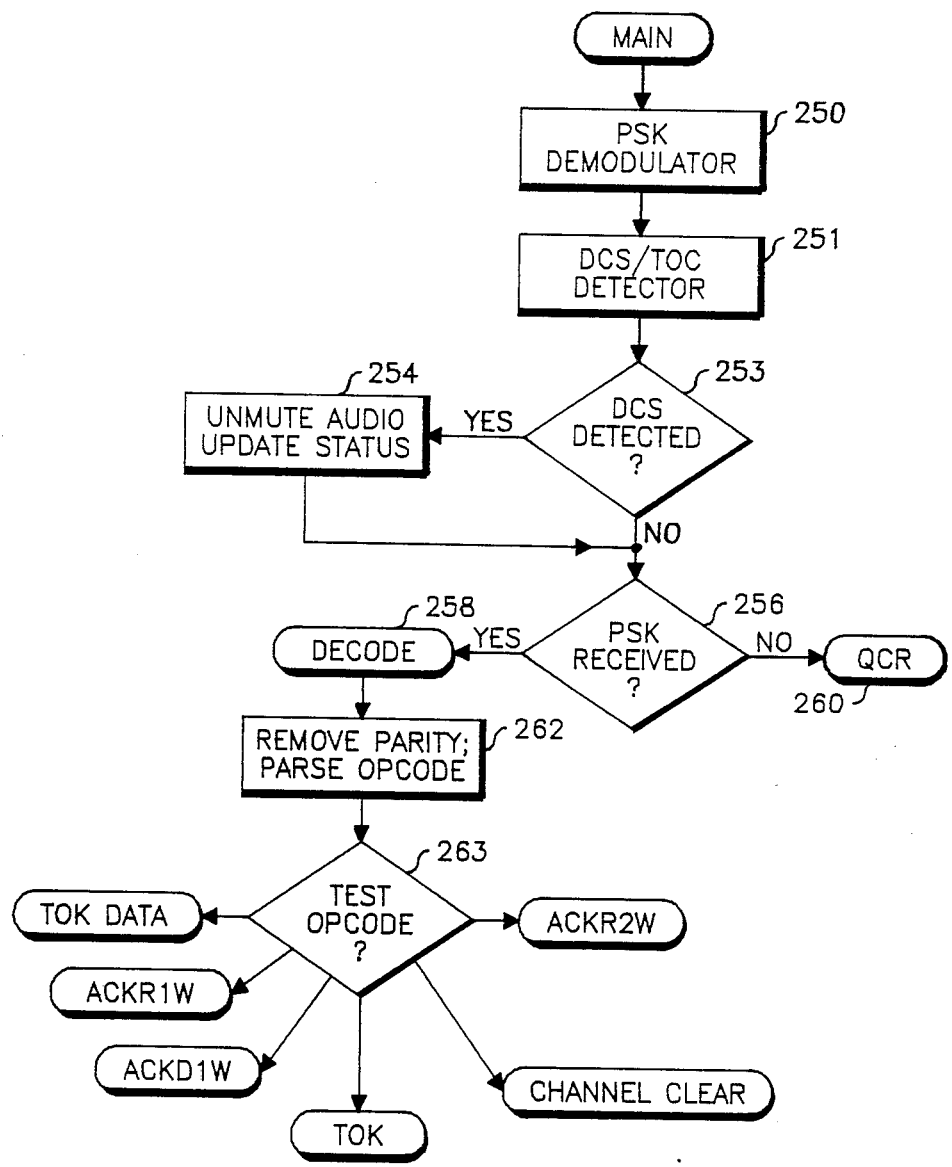
FIG. 14 is a mobile flow chart showing the MAIN routine.

A corresponding set of flow charts for mobile operation shows mobile response to the system commands. In FIG. 14 the MAIN routine is shown. The mobile microprocessor demodulates the PSK 250 and detects the DCS or TOC 251. If the proper DCS is detected 253, meaning that the system is authorizing mobile units of the instant mobile's fleet to receive a message, the receiver audio is unmuted and other mobile status indicators are set to an authorize state 254. If the proper DCS code is not detected, the microprocessor is instructed to test for the presence of PSK data 256. Even though DCS and a TOK PSK are transmitted simultaneously under most conditions, PSK is detected first. A positive test results in a branch to a DECODE subroutine 258; a negative result causes a branch to a QCR subroutine 260.

The DECODE subroutine 258 removes the parity, error corrects, and removes the central control station transmitted opcode from the PSK data 262. A test of the opcode 263 results in a branch to one of six subroutines to be described later.

Figure 15:
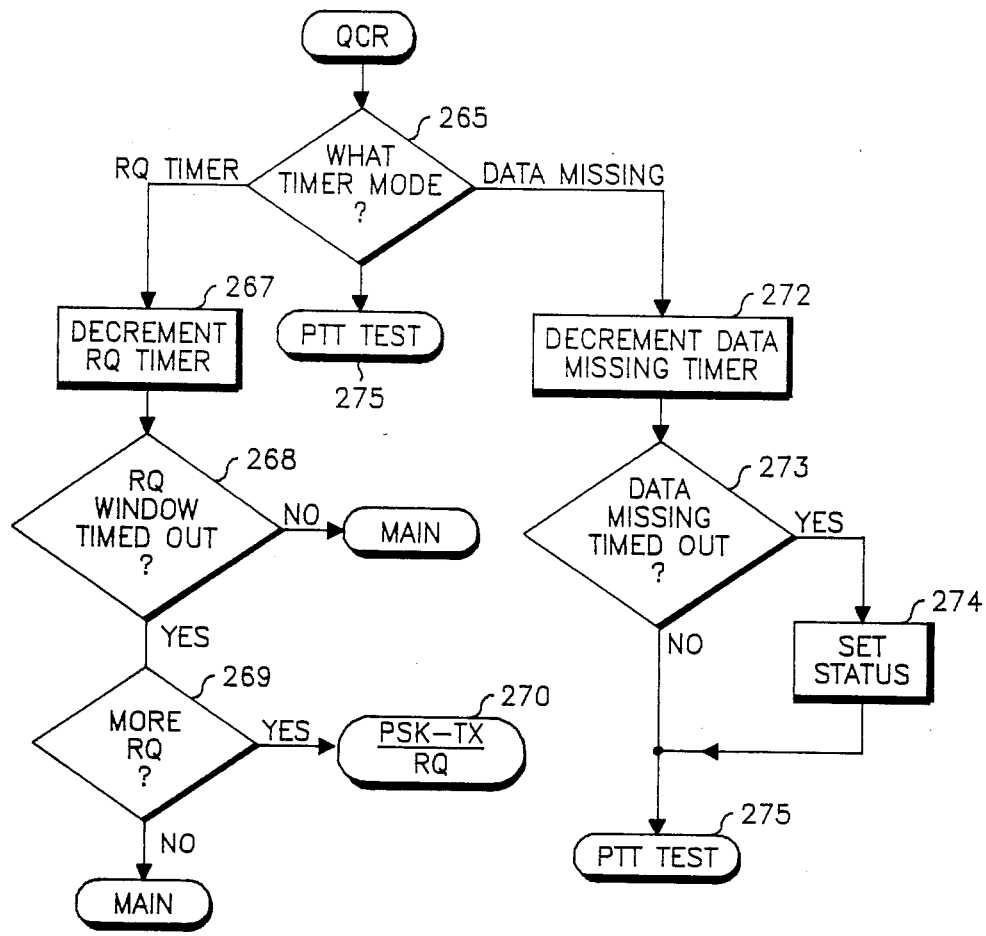
FIG. 15 is a mobile flow chart showing the QCR subroutine.

The QCR subroutine 260 is diagrammed in the block diagram of FIG. 15. This subroutine can increment two timer functions—the request window for an ACKR2W acknowledge or a timed out window for an ACKR1W acknowledge, and a "data missing" mobile transmitter disabling function. A decision is made whether the request (RQ) timer or the data missing timer is to be employed 265. If the RQ timer mode is detected, the RQ timer is decremented one count 267 and the RQ timer is tested for time out 268. A negative result from the RQ timer test 268 returns the program back to the MAIN routine. A positive result causes a check 269 of the number of times the mobile has tried to request service since the PTT button has been pushed. In this particular embodiment, seven attempts to request service are allowed before the request attempt is abandoned and the user notified. If more requests are allowed the PSK-TX subroutine 270 is entered with an internal opcode to cause the transmission of a request for service; if not, the program reverts back to the MAIN routine.

If the data missing timer mode is detected, the missing data timer is decremented 272 one count and a test 273 is performed on the remaining count of the timer. A time out, indicating that the mobile has not received QCR controller data for a period of time, causes the transmitter to be disabled and sets other program flags for a missing data condition 274. A negative result or a completion of the set status step 274 cause the program to enter the PTT-TEST subroutine 275.

Figure 16:
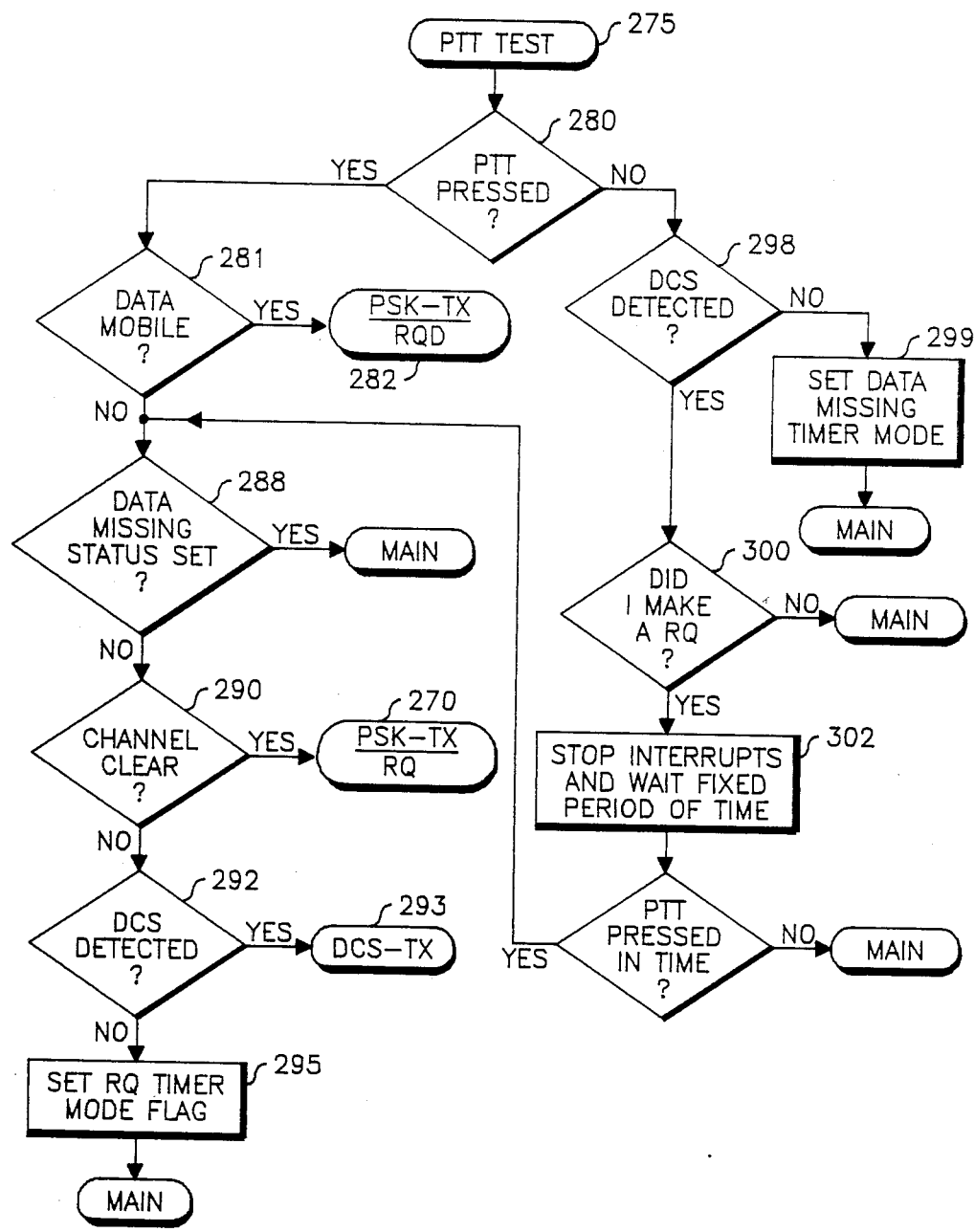
FIG. 16 is a mobile flow chart showing the PTT TEST subroutine.

The PTT-TEST subroutine 275, FIG. 16, samples the voltage level on an input from the PTT button. Depending upon the level a logic decision is made 280. If the button is pushed, indicating the desire of the user to transmit a message, a series of tests are made to determine the course of action of the mobile.

If the mobile is a data mobile, a data device is activating the PTT line and the program branches 281 to the PSK-TX subroutine 282 with the internal opcode instruction to transmit a data request (RQD). If the mobile is not a data mobile, a test is performed 288 to determine if the data missing status has been set in which case the program transfers back to the MAIN routine thereby preventing the keying of the transmitter. If the data missing status is not set, a test for "channel clear" is performed 290 and a positive result sends the mobile directly to the PSK-TX subroutine 270 with the internal opcode RQ to cause the mobile to transmit a request for service and continue transmitting. If channel clear is not set, the final test is to determine if DCS were detected. If DCS were detected 292 meaning that the instant mobile's fleet has been authorized to use the channel and that transmission is allowed, the program goes to the DCS-TX subroutine 293. Failing all above tests, indicating that a new request for service sequence is being made by the user pushing his PTT button, the RQ timer mode is set 295 and the program returns to the MAIN routine.

If the result of the PTT test 280 yields the fact that the PTT button has not been pushed, two additional tests are made. A check to determine if DCS were detected is made 298 and if DCS were not detected, the data missing timer mode is set 299. If DCS were detected a test 300 is made to determine if the instant mobile made the request for service which is now being granted with the transmission of the proper DCS. If no, the program reverts to the MAIN routine; if yes, the mobile stops all interrupts to the program and waits for a fixed amount of time for the user to press the PTT button 302. When the PTT button is pressed, the program rejoins the PTT pressed subroutine. If the PTT is not pressed before the timer times out, the program reverts to the MAIN routine.

Figure 17A:
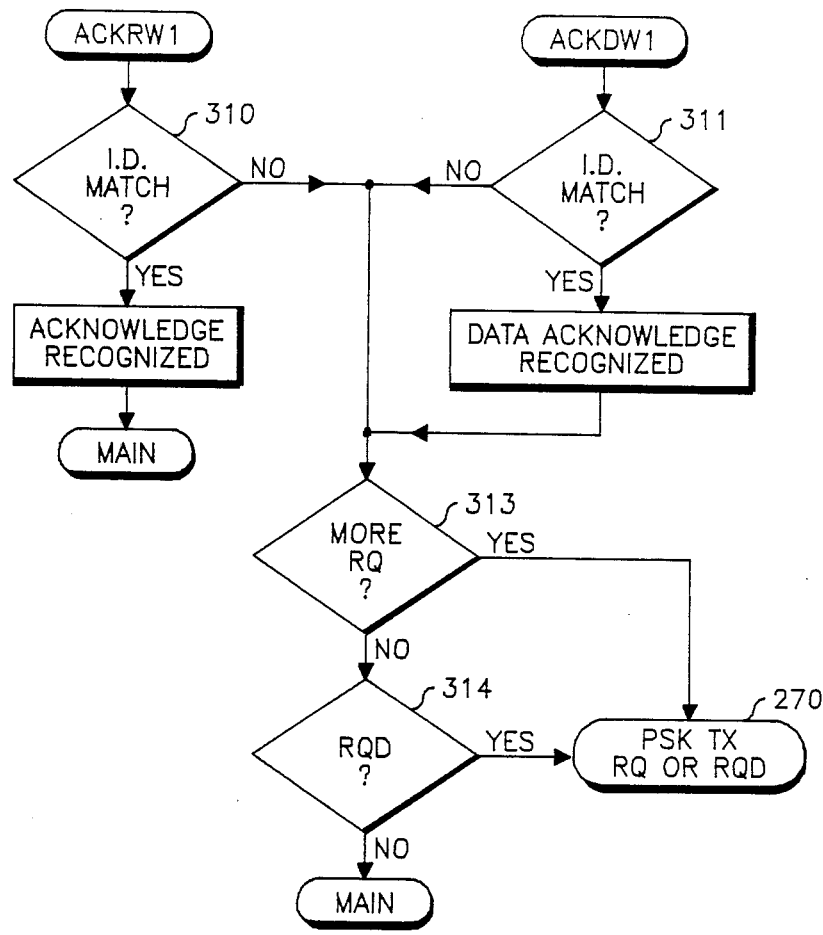
FIG. 17A is a mobile flow chart showing the ACKR1W and ACKD1W subroutines.

As stated earlier, when PSK data is detected and parsed, six of codes are available to instruct the mobile in a course of action. Each of these upcode subroutines will now be examined. Referring to FIG. 17A, the flow chart of activities following the reception of an ACKR1W or an ACKD1W acknowledge is diagrammed. Both acknowledgements create a check for ID match 310, 311 and, on an unsuccessful match, decisions 313, 314 are made whether to transmit a request for service (RQ, RQD) via PSK-TX subroutine or not to transmit and return to the MAIN routine. A successful ID match indicates that the instant mobile's fleet is already in the QCR Controller's request queue and a request transmission is not necessary.

Figure 17B:
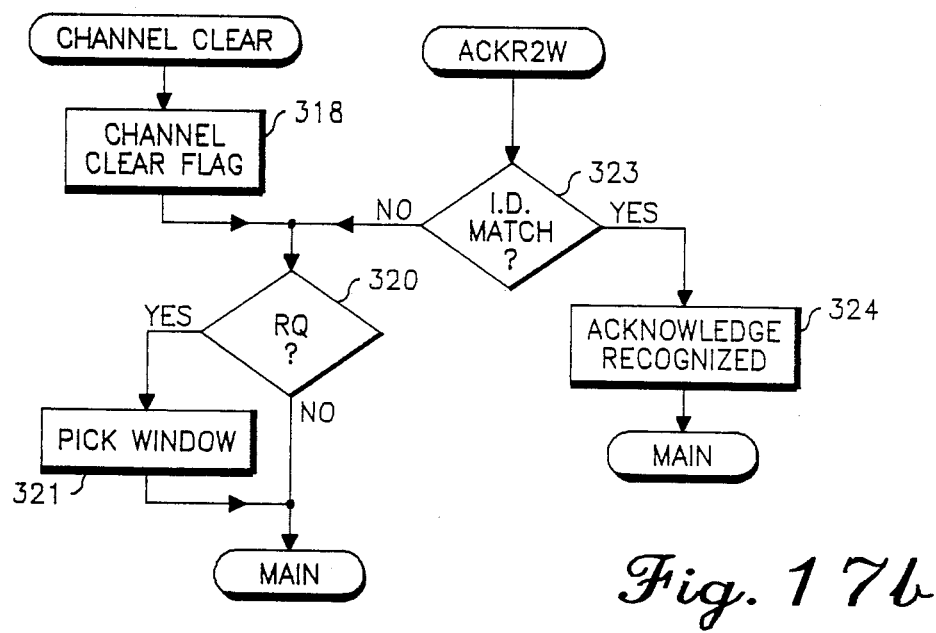
FIG. 17B is a mobile flow chart showing the "channel clear" and ACKR2W subroutines.

The "channel clear" opcode and the ACKR2W opcode responses are shown in FIG. 17B. Detection of "channel clear" results in a "CC" flag being set 318 for use by the PTT test routine and a check 320 if an RQ should be made. If a request is to be made, one of two windows are randomly selected 321 before returning to the MAIN routine. The ACKR2W tests for an ID match 323 before selecting a response window 321 on a mismatch. On a match, the request of another mobile in the same fleet as the instant mobile is recognized 324 and a request transmission is not necessary.

Figure 17C:
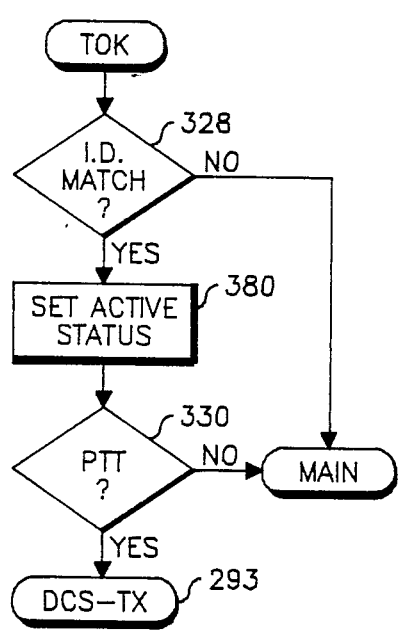
FIG. 17C is a mobile flow chart showing the TOK subroutine.

FIG. 17c diagrams the response to a TOK opcode—a check for an ID match 328 and a branch to the DCS-TX subroutine 293 if the PTT button is pressed.

Figure 17D:
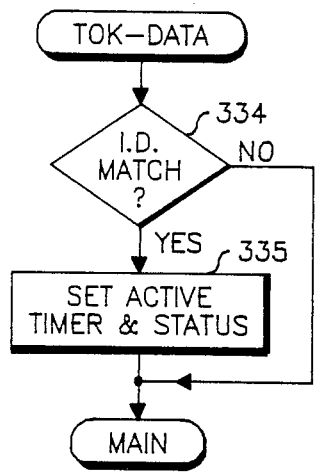
FIG. 17D is a mobile flow chart showing the TOK-DATA subroutine.

FIG. 17d diagrams the response to a TOK-DATA opcode. TOK-DATA tests for an ID match 334 and sets the active timer and status flags on a positive match 335.

Figure 18:
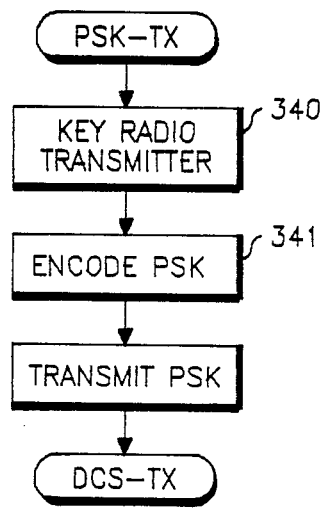
FIG. 18 is a mobile flow chart showing the PSK-TX subroutine.

FIG. 18 diagrams the PSK-TX subroutine which keys the transmitter 340 before encoding the internal opcode which is produced at the exit points of other parts of the program (RQ, RQD) and adding parity 341.

Figure 19:
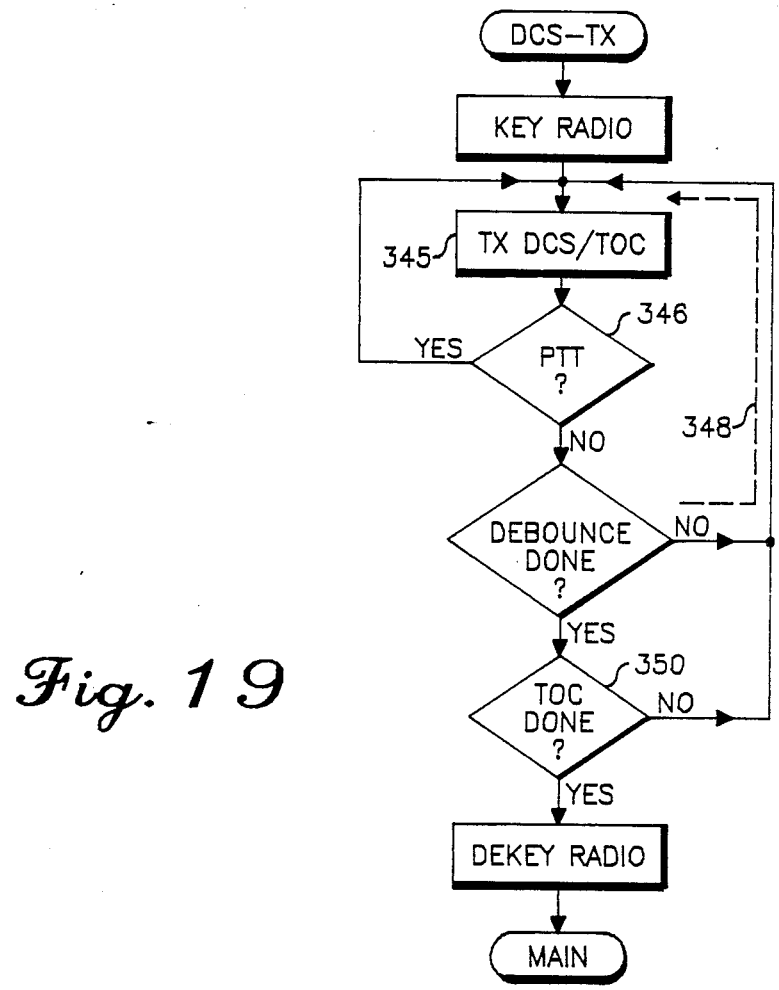
FIG. 19 is a mobile flow chart showing the DCS-TX subroutine.

FIG. 19 diagrams the DCS-TX subroutine which transmits DCS 345 as long as the test for a pressed PTT button 346 is positive. When the PTT button is released, a delay loop 348 is activated which maintains the transmission of DCS for a period long enough to be sure that the PTT button has indeed been released. Upon completion of the debounce delay, a second delay is activated for the DCS/TOC transmitter to transmit TOC and terminated by the TOC done test 350.

The previous functions cooperate in a manner that allows the mobile to communicate with other mobiles in the same fleet. Accordingly, it may be instructive to follow the process of a typical call through the mobile software. Assuming a mobile user pushes his PTT button while the QCR system is occupied with another fleet and starting at MAIN in FIG. 14, the PSK demodulator 250 does not demodulate PSK and the DCS is the wrong code so the program passes to the QCR subroutine 260. Referring to FIG. 15, the normal operating mode of the timer is to time out missing data. Since data has recently been received, it will not yet time out and so the program passes to the PTT TEST subroutine 275 on FIG. 16. Since the PTT button has been pressed, the program runs the gauntlet of tests: data mobile 281, data missing 288, channel clear 296, and DCS detected 292. The response to each test is negative, resulting in the RQ timer mode flag 295 being set.

This sequence continues until some parameter changes; in this example, the user releases the PTT button. The mobile program detects the change: PTT is not pressed 280. The data missing timer mode is set so that the next cycle through the program causes a timer mode detect 265, FIG. 15, and the start of the data missing timer. This loop is followed until a mobile in the fleet being served stops transmitting. (The missing data timer is set for a time longer than the QCR system allows any mobile to transmit and therefore times longer than the periods between PSK data).

The central control station generates a PSK data ACKR1W after the detection of served mobile TOC. The instant mobile detects the reception of PSK data 256, FIG. 14, and passes the program to the DECODE subroutine 258. The opcode is tested and found to be an ACKR1W 263.

Referring to FIG. 17A, the ACKR1W routine tests for an ID match 310 and, since this is the first request made by the instant mobile's fleet, a match is not found. This is the first need for a request (test 313 passes) so the program goes immediately to the PSK TX routine 270 with an internal opcode of RQ (request). The PSK-TX subroutine, FIG. 18, encodes the RQ in PSK and transmit the request to the control station. The program passes through the DCS-TX subroutine back to the MAIN routine.

Until the central control station is ready to assign the channel to the instant mobile, the mobile program cycles through the MAIN-QCR-PTT TEST-MAIN subroutines. The ACKR1W comes with an ID match causing the mobile to ignore all future PTT presses). When the grant is made, the mobile detects PSK 256, FIG. 14, and enters the DECODE subroutine 258. A TOK opcode is found 263 and the subroutine is entered, FIG. 17c. Since the ID transmitted with the TOK is that of the instant mobile, the mobile is placed on an active status 380. If the PTT button is pressed, the program goes directly to the DCS-TX subroutine 293; if not the program goes to the MAIN routine. The MAIN routine leads to the PTT Pressed test 280, FIG. 16, and a DCS detected 298. The control station transmits both TOK and DCS simultaneously, consequently the test 298 is positive. The program waits a period of time and upon detection of PTT pressed, the program passes to the DCS-TX subroutine via DPL detected test 292.

Referring to FIG. 19, the mobile transmitter is keyed and the program remains in the PTT test 346—TX DCS 345 loop until the PTT button is released. The mobile TOC is then transmitted as described earlier.

Data communication

Figure 20:
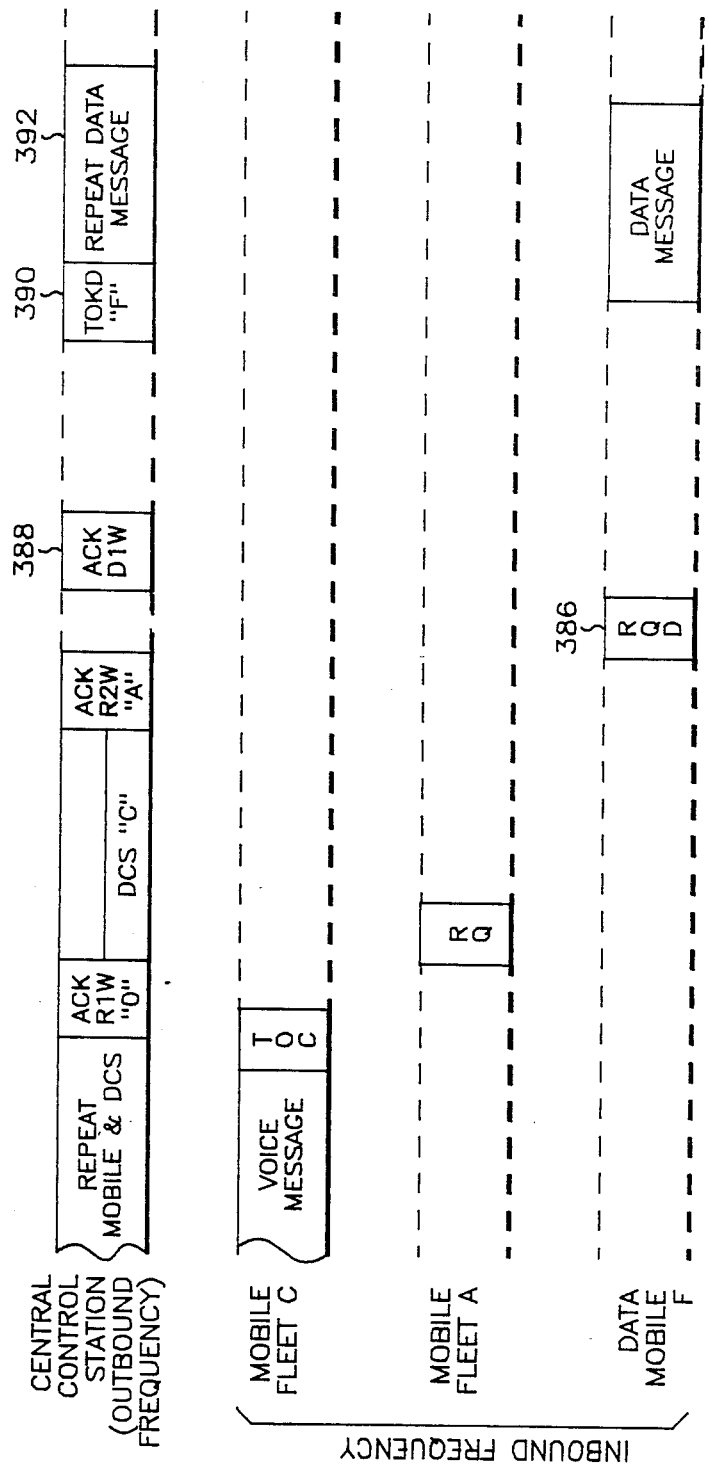
FIG. 20 is a relative timing diagram of channel activity during a data mobile request.

The QCR system carries data traffic in addition to the primary analog voice traffic. Referring to FIG. 20, the QCR Controller 62 uses special opcodes such as RQD, ACKD1W, and TOKD to control the channel for data communication. Data mobiles send RQD 386 to request data service. The QCR Controller 62 places the data mobile identification in a last-in first-out stack which is separate from the FIFO queue. If the channel is busy, an ACKD1W acknowledge 388 is sent back. When the current non-data message is timed out, all data fleets will be serviced before the next non-data allocation is made.

Data allocation is performed by sending TOKD 390 with the identification of one fleet. A brief period of time 392, typically five seconds, is allocated during which one requesting data mobile fleet will be uninhibited and may transmit and receive data. At the end of the period, the next data mobile fleet is authorized in the same manner until all requesting data mobiles have been serviced. Then the first fleet in the non-data queue is assigned a channel. The fact that data requests are granted before non-data requests is not objectionable due to the brief allocation provided for data. For the same reason, the LIFO instead of a FIFO process for data requests is acceptable for data users in the current embodiment.

Since all data requests are serviced before the next non-data assignment, the decoding of a TOK (non-data) by a data mobile indicates that the data mobile missed its assignment. It may then re-request at the next request solicitation. The more complex queue updating performed for non-data requests is not needed for data requests.

For those mobile users who rely upon a single channel community repeater to re-transmit their messages over a wide area, the novel Queued Community Repeater provides a significant improvement in the service provided. An analogy to the improvement this system provides over previous systems is the difference between a meat market which gives numbers for service and calls customers when their turn comes versus the market that randomly serves those who jostle and scream the loudest.

It should be realized, of course, that modifications and variations of this communications system such as limiting mobile communications to non-radio users connected to the central control station without repeating the mobile message are possible but fall within the true spirit and scope of the invention.

We claim:

1. A communications system for a central control station and a plurality of remote units, each remote unit adapted to receive and transmit messages on a single communications channel, comprising:
   (a) remote units arranged in predetermined groupings, each remote unit comprising:
      means for generating a request for service for its particular group and transmitting said request to the central control station on the single communications channel; and
      means for receiving a grant of service from the central control station authorizing real time utilization of the single communications channel by a particular group of remote units; and
   (b) a central control station controlling access to the single communications channel, comprising:
      means for detecting an end-of-transmission condition of a first remote unit of a first group;
      means for establishing predetermined time periods following said detection on the single communications channel during which a remote unit of said second group may request service;
      means for maintaining a grant of service to said first group of remote units following said predetermined time period whereby a second remote unit of said first group may transmit;
      means for revoking said grant of service if said second remote unit does not transmit; and
      means for receiving said second group remote unit request, generating a second group grant of service when said first group grant of service is revoked, and transmitting said second group grant of service to said second group.

2. A communications system in accordance with claim 1, wherein said central control station further comprises means for storing said request for service from said second group remote unit in a queue with earlier remote unit requests thereby facilitating controlled grants of service on the single communications channel.

3. A communications system in accordance claim 2, wherein said central control station further comprises means for recalling remote unit requests from said storing means on a first-in first-out basis.

4. A communications system in accordance with claim 1, wherein each remote unit further comprises means for inhibiting reception and transmission of messages on the single communications channel until authorized to allow said reception and transmission.

5. A communications system in accordance with claim 4, wherein each remote unit further comprises means for detecting a continuously transmitted authorization signal and responsively enabling said remote unit.

6. A communications system in accordance with claim 1 wherein each remote unit further comprises means for generating a end-of-transmission signal at the conclusion of said message and transmitting the same to said central controlled station.

7. A communications system in accordance with claim 1, wherein said central control station end-of-transmission detection means is activated by an end-of-transmission signal transmitted from said first remote unit.

8. A communications system in accordance with claim 1 wherein said central control station further comprises means for generating and transmitting an acknowledgement confirming reception of said request for service to said requesting second group remote unit.

9. A communications system in accordance with claim 8, wherein said central control station further comprises means for generating and transmitting a signal indicating a commencement of said predetermined time period.

10. A communications system in accordance with claim 9 wherein said acknowlegement generating means and said commencement signal generating means are identical, thereby reducing the amount of time required for signalling.

11. A communications system in accordance with claim 9 wherein said central control station commencement signal generating means further comprises means for intermittently causing requesting remote units to randomly request service in one of two response windows, thereby reducing contention between said requesting remote units.

12. A communications system in accordance with claim 9 wherein each remote unit further comprises means for detecting said predetermined time period commencement signal on the single communications channel and coordinating any request for service to said commencement signal.

13. A communications system in accordance with claim 1, wherein said means for receiving and generating is activated when the single communications channel is unoccupied with message and request transmissions.

14. A communications system for a central control station and a plurality of remote radio transceivers, each transceiver adapted to communicate messages on a single duplex radio channel, comprising:
- (a) remote radio transceivers arranged in predetermined groups, each transceiver comprising:
    means for generating a request for service for its group and transmitting said request on an inbound frequency of the duplex radio channel to the central control station; and
    means for receiving a grant of service from the central control station on an outbound frequency of the duplex radio channel authorizing real time utilization of the duplex radio channel, and
- (b) the central control station controlling access to the single duplex radio channel, comprising:
    means for detecting an end-of-transmission condition of a first remote radio transceiver of a first group;
    means for establishing a predetermined time period on the duplex radio channel following said detection during which a remote radio transceiver of a second group may request service;
    means for receiving and storing said second group remote radio transceiver request for service in a queue with previous radio transceiver requests;
    means for maintaining a grant of service to said first group of remote radio transceivers following said predetermined time period whereby a second remote transceiver of said first group may transmit;
    means for revoking said grant of service if said second remote transceiver does not transmit; and
    means for generating and transmitting a grant of service on the outbound frequency of the duplex radio channel to a requesting remote radio transceiver group stored first in said queue when said first group grant of service is revoked, thereby authorizing real time utilization of the single duplex radio channel by a particular radio transceiver group.

15. A communications system in accordance with claim 14, wherein said generating means further comprises means for recalling remote radio transceiver request from said queue on a first-in first-out basis.

16. A communications system in accordance with claim 14 wherein said central control station further comprises a second storing means for storing requests for service from remote radio transceivers equipped with data devices, thereby providing a capability of separately processing remote data transceiver requests.

17. A communications system in accordance with claim 14, wherein each remote radio transceiver further comprises means for inhibiting remote radio transceiver reception and transmission of messages on the duplex radio channel until authorized to allow said reception and transmission.

18. A communication system in accordance with claim 17 wherein each remote radio transceiver further comprises means for detecting a continuously transmitted authorization signal and responsively enabling said radio transceiver.

19. A communications system in accordance with claim 14, wherein each remote radio transceiver further comprises means for generating an end-of-transmission signal for transmission at the conclusion of said message and transmitting the same to said central control station.

20. A communications system in accordance with claim 19, wherein said central control station end-of-transmission detecting means is activated by an end-of-transmission signal transmitted from said first remote radio transceiver.

21. A communications system in accordance with claim 14, wherein said central control station further comprises means for generating and transmitting an acknowledgement confirming reception of said request for service to said requesting second group remote radio transceiver.

22. A communications system in accordance with claim 21, wherein said central control station further comprises means for generating and transmitting a signal indicating the commencement of said predetermined time period.

23. A communications system in accordance with claim 22, wherein said acknowledgement generating means and said commencement signal generating means are identical, thereby reducing the amount of time required for signalling.

24. A communications system in accordance with claim 22, wherein said remote station commencement signal generating means further comprises means for intermittently causing requesting remote radio transceivers to randomly request service in one of two response windows, thereby reducing contention between said requesting remote radio transceivers.

25. A communications system in accordance with claim 22, wherein each remote radio transceiver further comprises means for detecting said commencement signal on the duplex radio channel and coordinating any request for service to said commencement signal.

26. A communications system in accordance with claim 14, wherein said generating means is activated when the duplex radio channel is unoccupied with message and request transmissions.

27. A method of centrally controlling the access of a plurality of remote units arranged in predetermined groups to a single communications channel, each remote unit adapted to transmit and receive messages within its group during periods of service granted by the central control on the single communications channel, comprising the steps of:
    detecting an end-of-transmission condition of a served remote unit in a first group;
    establishing a predetermined time period on the single communications channel in response to said detection during which a remote unit in a second group not currently having service on the channel may request service;

receiving said request for service from said remote unit of said second group not having service during said established period of time;

storing said received request in a queue with previous remote unit requests;

maintaining a grant of service to the first group of said served remote unit following said predetermined time period whereby a second remote unit in said first group may commence transmission;

revoking said grant of service if said second remote unit in said first group does not transmit; and generating and transmitting a grant of service to a remote unit group stored first in said queue when said first group grant of service is revoked thereby authorizing real time utilization of the single communications channel by that remote unit group.

28. The method in accordance with claim 27 further comprising the step of continuously authorizing reception by said served group of remote units.

29. The method in accordance with claim 27 further comprising the step of acknowledging said received request for service on the single communications channel.

30. The method in accordance with claim 29 further comprising the step of transmitting a signal indicating the commencement of said predetermined time period thereby soliciting a request for service during said predetermined time period.

31. The method in accordance with claim 30, wherein the step of acknowledging a request and the step of transmitting a time period commencement signal are combined into one acknowledgement, thereby reducing signalling time.

* * * * *